US011198776B2

(12) United States Patent
Tanaka et al.

(10) Patent No.: US 11,198,776 B2
(45) Date of Patent: Dec. 14, 2021

(54) RESIN COMPOSITION AND RESIN MOLDED ARTICLE

(71) Applicant: Eastman Chemical Company, Kingsport, TN (US)

(72) Inventors: Ryo Tanaka, Minamiashigara (JP); Kana Miyazaki, Minamiashigara (JP); Kenji Yao, Minamiashigara (JP)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 16/243,470

(22) Filed: Jan. 9, 2019

(65) Prior Publication Data

US 2020/0071493 A1 Mar. 5, 2020

(30) Foreign Application Priority Data

Aug. 31, 2018 (JP) .............................. JP2018-164065

(51) Int. Cl.
*C08L 1/14* (2006.01)
*C08L 1/12* (2006.01)
*B29K 105/06* (2006.01)
*B29C 45/00* (2006.01)
*B29K 1/00* (2006.01)

(52) U.S. Cl.
CPC .................. *C08L 1/14* (2013.01); *C08L 1/12* (2013.01); *B29C 45/0001* (2013.01); *B29K 2001/12* (2013.01); *B29K 2105/06* (2013.01); *C08L 2205/025* (2013.01); *C08L 2205/03* (2013.01); *C08L 2205/035* (2013.01); *C08L 2205/16* (2013.01); *C08L 2207/53* (2013.01)

(58) Field of Classification Search
CPC .................. C08L 1/10; C08L 1/12; C08L 1/14
See application file for complete search history.

(56) References Cited

U.S. PATENT DOCUMENTS

| | | | | |
|---|---|---|---|---|
| 4,770,931 A | * | 9/1988 | Pollock | C08J 5/18 215/400 |
| 5,883,025 A | * | 3/1999 | Karstens | B65D 65/466 442/344 |
| 9,018,283 B2 | * | 4/2015 | Imanishi | C08L 1/14 524/37 |
| 2013/0085213 A1 | * | 4/2013 | Imanishi | C08L 1/14 524/40 |
| 2013/0150501 A1 | * | 6/2013 | Basu | C08L 1/12 524/41 |
| 2014/0162010 A1 | * | 6/2014 | Steelman | B44C 1/105 428/41.8 |
| 2016/0090471 A1 | * | 3/2016 | Yao | C08L 67/04 524/37 |
| 2016/0090473 A1 | * | 3/2016 | Yao | C08L 1/10 524/40 |
| 2016/0200836 A1 | * | 7/2016 | Tanaka | C08B 3/16 536/64 |
| 2016/0251452 A1 | * | 9/2016 | Toyama | C08L 67/02 536/64 |
| 2017/0260294 A1 | * | 9/2017 | Toyama | C08L 1/14 |
| 2019/0256613 A1 | * | 8/2019 | Pecorini | C08B 3/06 |
| 2019/0264007 A1 | * | 8/2019 | Feng | C08L 1/10 |
| 2019/0276642 A1 | * | 9/2019 | Miyazaki | B29C 45/0001 |
| 2019/0276643 A1 | * | 9/2019 | Miyazaki | C08K 5/13 |
| 2019/0276644 A1 | * | 9/2019 | Yao | C08L 1/14 |
| 2019/0359794 A1 | * | 11/2019 | An | C08L 1/14 |
| 2019/0375916 A1 | * | 12/2019 | Yao | C08K 5/0016 |
| 2020/0071493 A1 | * | 3/2020 | Tanaka | C08L 1/12 |
| 2020/0071494 A1 | * | 3/2020 | Tanaka | C08K 5/17 |
| 2020/0071499 A1 | * | 3/2020 | Miyazaki | C08L 1/10 |
| 2020/0071503 A1 | * | 3/2020 | Miyazaki | C08L 1/14 |
| 2020/0071504 A1 | * | 3/2020 | Miyazaki | C08L 1/14 |

FOREIGN PATENT DOCUMENTS

| | | |
|---|---|---|
| JP | 2843827 B2 | 1/1999 |
| JP | 2012-197376 A | 10/2012 |
| JP | 2012219112 A * | 11/2012 |

OTHER PUBLICATIONS

Machine Translation of JP-2012219112-A, 2020 (Year: 2020).*
Thomas et al. (Composite Materials, Ullmann's Encyclopedia of Industrial Chemistry, 2016) (Year: 2016).*
Pang et al. (Composites: Part A 70, 2015, 52-58) (Year: 2015).*
Toyama, K et al., "Development of cardanol-bonded cellulose thermoplastic: high productivity achieved in two-step heterogeneous process;" Cellulose 22:1625-1639.

* cited by examiner

*Primary Examiner* — Liam J Heincer

(57) ABSTRACT

Provided is a resin composition containing: a cellulose acylate (A); a thermoplastic elastomer (B); and a fiber (C).

16 Claims, No Drawings

RESIN COMPOSITION AND RESIN MOLDED ARTICLE

CROSS-REFERENCE TO RELATED APPLICATIONS

This application is based on and claims priority under 35 USC 119 from Japanese Patent Application No. 2018-164065 filed on Aug. 31, 2018.

BACKGROUND

Technical Field

The present invention relates to a resin composition and a resin molded article.

Related Art

Patent Document 1 discloses a molded article containing cellulose acetate and a natural cellulose fiber for reinforcement or a natural cellulose.

Non-Patent Document 1 discloses physical properties of a composite containing a cellulose ester and a glass fiber.

CITATION LIST

Patent Literature

Patent Document 1: Japanese Patent No. 2843827

Non Patent Literature

Non-Patent Document 1: Toyama K, Soyama M, Tanaka S, Iji M (2015) "Development of cardanol-bonded cellulose thermoplastics: high productivity achieved in two-step heterogeneous process.", Cellulose 22:1625-1639

SUMMARY

Aspects of non-limiting embodiments of the present disclosure relates to provide a resin composition capable of obtaining a resin molded article having excellent tensile strength as compared to a resin composition containing only a cellulose acylate (A) and a fiber (C).

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

Specific means for achieving the above object include the following aspects.

According to an aspect of the present disclosure, there is provided a resin composition including a cellulose acylate (A), a thermoplastic elastomer (B), and a fiber (C).

DETAILED DESCRIPTION

An exemplary embodiment will be described below. These descriptions and examples are illustrative of the exemplary embodiments and do not limit the scope of the exemplary embodiments.

In the present disclosure, a numerical range indicated by using "to" shows a range including numerical values written before and after "to" as a minimum value and a maximum value, respectively.

In the numerical ranges described in stages in the present disclosure, an upper limit value or a lower limit value written in one numerical range may be replaced with an upper limit value or a lower limit value of a numerical range in other staged descriptions. In addition, in a numerical range described in the present disclosure, an upper limit value or a lower limit value of the numerical range may be replaced with a value shown in an example, respectively.

In the present disclosure, the term "process" includes not only an independent process, but also a process that cannot be clearly distinguished from other processes as long as the intended purpose of the process can be achieved.

In the present disclosure, each component may contain a plurality of corresponding substances. In the present disclosure, when the amount of each component in the composition is referred to, it refers to the total amount of a plurality of substances exist in the composition in a case where the plurality of substances corresponding to each component in the composition exist, unless otherwise specified.

In the exemplary embodiment, "(meth)acryl" refers to at least one of acrylic and methacryl, and "(meth)acrylate" refers to at least one of acrylate and methacrylate.

In the present disclosure, the cellulose acylate (A), the thermoplastic elastomer (B), the fiber (C), and the cardanol compound (D) may also be referred to as a component (A), a component (B), a component (C), and a component (D).

<Resin composition>

The resin composition of the exemplary embodiment includes the cellulose acylate (A), the thermoplastic elastomer (B), and the fiber (C).

According to the resin composition according to the exemplary embodiment, a resin molded article having excellent tensile strength is obtained.

As a result of study, the inventor of the present disclosure discovered that when the thermoplastic elastomer (B) is added to the cellulose acylate (A) and the fiber (C), the tensile strength of the resin molded article is improved. Since the thermoplastic elastomer (B) does not have a function of improving the tensile strength with respect to the simple substance of the cellulose acylate (A) (shown in Reference Example A and Reference Example B described below), it is surprising that the tensile strength of the resin molded article was improved by adding the thermoplastic elastomer (B) to the resin composition. As a mechanism that the tensile strength of the resin molded article including the cellulose acylate (A) and the fiber (C) is improved due to addition of the thermoplastic elastomer (B), the following mechanism is considered.

It is assumed that since melted cellulose acylate (A) has a high wettability with respect to the fiber (C), when the fiber (C) is added to the melted cellulose acylate (A), shear stress applied to the cellulose acylate (A) is likely to be transferred to the fiber (C), and cutting of the fiber (C) occurs due to the shear stress.

Regarding this, when the fiber (C) and the thermoplastic elastomer (B) are added to the melted cellulose acylate (A), the shear stress applied to the cellulose acylate (A) is unlikely to be transmitted to the fiber (C), so that the cutting of the fiber (C) is prevented. As a result, the resin composition contains the fiber (C) having a length close to an original length, and the tensile strength is improved as compared to a case where the thermoplastic elastomer (B) is not added.

As a mechanism that the shear stress applied to the cellulose acylate (A) is unlikely to be transferred to the fiber (C) due to addition of the thermoplastic elastomer (B), the following two mechanisms are considered. (1) Since the shear stress is consumed due to dispersion of the thermoplastic elastomer (B) in a kneaded product, propagation of the shear stress applied to the fiber (C) is prevented. (2) the thermoplastic elastomer (B) dispersed in a kneaded product covers the fiber (C), and prevents cutting of the fiber (C).

From the viewpoint of further improving the tensile strength of the resin molded article, the resin composition according to the exemplary embodiment preferably further includes a cardanol compound (D). It is considered that the cardanol compound (D) has a high miscibility with the cellulose acylate (A), and has an aromatic ring which is a hydrophobic structure, thereby reducing the wettability of the cellulose acylate (A) with respect to the fiber (C). It is assumed that since the shear stress applied to the cellulose acylate (A) is unlikely to be transferred to the fiber (C) due to a decrease in the wettability, cutting of the fiber (C) is prevented, and as a result, the tensile strength of the resin molded article is improved.

The components of the resin composition according to the exemplary embodiment will be described in detail below.

[Cellulose Acylate (A): Component (A)]

The cellulose acylate (A) is a cellulose derivative in which at least a part of hydroxy groups in the cellulose are substituted (acylated) with an acyl group. The acyl group refers to a group including a structure of —CO—$R^{AC}$ ($R^{AC}$ represents a hydrogen atom or a hydrocarbon group).

The cellulose acylate (A) is, for example, a cellulose derivative represented by the following general formula (CA).

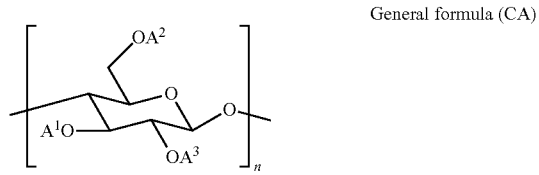

General formula (CA)

In the general formula (CA), $A^1$, $A^2$ and $A^3$ each independently represents a hydrogen atom or an acyl group, and n represents an integer of 2 or more. However, at least a part among the n $A^1$s, n $A^2$s, and n $A^3$s represent acyl groups. The n $A^1$s in the molecule may be all identical to, partly identical to, or different from one another. Similarly, the n $A^2$s and the n $A^3$s in the molecule may be all identical to, partly identical to, or different from one another.

The hydrocarbon group in the acyl group represented by $A^1$, $A^2$ and $A^3$ may be linear, branched or cyclic, but is preferably linear or branched, and more preferably linear.

The hydrocarbon group in the acyl group represented by $A^1$, $A^2$ and $A^3$ may be a saturated hydrocarbon group or an unsaturated hydrocarbon group, but is more preferably a saturated hydrocarbon group.

The acyl group represented by $A^1$, $A^2$ and $A^3$ is preferably an acyl group having 1 to 6 carbon atoms. That is, the cellulose acylate (A) is preferably cellulose acylate (A) in which the number of carbon atoms of the acyl group is from 1 to 6. The cellulose acylate (A) in which the number of carbon atoms of the acyl group is from 1 to 6 is more likely to form a resin molded article having excellent impact resistance, as compared to a cellulose acylate (A) including an acyl group having a number of carbon atoms of 7 or more.

A hydrogen atom in the acyl group represented by $A^1$, $A^2$ and $A^3$ may be substituted with a halogen atom (for example, a fluorine atom, a bromine atom, and an iodine atom), an oxygen atom, a nitrogen atom or the like, but is preferably not substituted.

Examples of the acyl group represented by $A^1$, $A^2$ and $A^3$ include a formyl group, an acetyl group, a propionyl group, a butyryl group (butanoyl group), a propenoyl group, a hexanoyl group, or the like. Among the above examples of the acyl group, the acyl group is more preferably an acyl group having a number of carbon atoms of 2 or more and 4 or less, and still more preferably an acyl group having a number of carbon atoms of 2 or 3, from the viewpoint of moldability of the resin composition, impact resistance of the resin molded article, or excellent tensile strength of the resin molded article.

Examples of the cellulose acylate (A) include cellulose acetate (cellulose monoacetate, cellulose diacetate (DAC), cellulose triacetate), cellulose acetate propionate (CAP), cellulose acetate butyrate (CAB), or the like.

The cellulose acylate (A) is preferably cellulose acetate propionate (CAP) and cellulose acetate butyrate (CAB), and is more preferably cellulose acetate propionate (CAP), from the viewpoint of impact resistance of the resin molded article, or excellent tensile strength of the resin molded article.

One type of cellulose acylate (A) may be used alone, or two or more types of cellulose acylate (A) may be used in combination.

A weight average degree of polymerization of the cellulose acylate (A) is preferably from 200 to 1000, more preferably from 500 to 1000, and still more preferably from 600 to 1000, from the viewpoint of moldability of the resin composition, impact resistance of the resin molded article, or excellent toughness of the resin molded article.

A weight average degree of polymerization of the cellulose acylate (A) is determined from a weight average molecular weight (Mw) by the following procedure.

First, the weight average molecular weight (Mw) of the cellulose acylate (A) is measured by using tetrahydrofuran, by performing polystyrene conversion based on a gel permeation chromatography apparatus (GPC apparatus: HLC-8320 GPC, manufactured by Tosoh Corporation, column: TSK gel ca-M).

Next, the polymerization degree of the cellulose acylate (A) is determined by dividing the weight average molecular weight (Mw) of the cellulose acylate (A) by a structural unit molecular weight thereof. For example, in a case where a substituent of the cellulose acylate is an acetyl group, the structural unit molecular weight is 263 when a degree of substitution is 2.4, and is 284 when the degree of substitution is 2.9.

The degree of substitution of the cellulose acylate (A) is preferably from 2.1 to 2.9, more preferably from 2.2 to 2.9, still more preferably from 2.3 to 2.9, and particularly preferably from 2.6 to 2.9, from the viewpoint of moldability of the resin composition, impact resistance of the resin molded article, or excellent toughness of the resin molded article.

In the cellulose acetate propionate (CAP), the ratio of the degree of substitution of the acetyl group to that of the propionyl group (acetyl group/propionyl group) is preferably from 0.01 to 1, and more preferably from 0.05 to 0.1, from the viewpoint of moldability of the resin composition, impact resistance of the resin molded article, or excellent toughness of the resin molded article.

The CAP is preferably a CAP satisfying at least one of the following (1), (2), (3), and (4), more preferably a CAP satisfying the following (1), (3), and (4), and still more preferably a CAP satisfying the following (2), (3), and (4).

(1) When the CAP is measured by a GPC method using tetrahydrofuran as a solvent, the weight average molecular weight (Mw) in terms of polystyrene is 160,000 to 250,000, the ratio Mn/Mz of the number average molecular weight (Mn) in terms of polystyrene to the Z average molecular weight (Mz) in terms of polystyrene is 0.14 to 0.21, and a ratio Mw/Mz of the weight average molecular weight (Mw) in terms of polystyrene to the Z average molecular weight (Mz) in terms of polystyrene is 0.3 to 0.7.

(2) When the CAP is measured by a GPC method using tetrahydrofuran as a solvent, the weight-average molecular weight (Mw) in terms of polystyrene is from 160,000 to 250,000, and a ratio of the number average molecular weight (Mn) in terms of polystyrene to the Z average molecular weight (Mz) in terms of polystyrene (Mn/Mz) is from 0.14 to 0.21. (3) When the CAP is measured by capillography at 230° C. in accordance with ISO 11443: 1995, a ratio of a viscosity η1 (Pa·s) at a shear rate of 1216 (/sec) to a viscosity η2 (Pa·s) at a shear rate of 121.6 (/sec) (η1/η2) is from 0.1 to 0.3. (4) When a small square plate test piece (D11 test piece specified by JIS K7139: 2009, 60 mm×60 mm, thickness 1 mm) obtained by injection molding of the CAP was left for 48 hours in an atmosphere at a temperature of 65° C. and a relative humidity of 85%, both an expansion coefficient in a MD direction and an expansion coefficient in a TD direction are from 0.4% to 0.6%. Here, the MD direction refers to a length direction of a cavity of a mold used for injection molding, and the TD direction refers to a direction orthogonal to the MD direction.

In the cellulose acetate butyrate (CAB), the ratio of the degree of substitution of the acetyl group to that of the butyryl group (acetyl group/butyryl group) is preferably from 0.05 to 3.5, and more preferably from 0.5 to 3.0, from the viewpoint of moldability of the resin composition, impact resistance of the resin molded article, or excellent toughness of the resin molded article.

The degree of substitution of the cellulose acylate (A) is an index showing a degree that the hydroxy group of the cellulose is substituted with the acyl group. That is, the degree of substitution is an index showing a degree of acylation of the cellulose acylate (A). Specifically, the degree of substitution refers to an intramolecular average of a number of substitution that three hydroxy groups in a D-glucopyranose unit of the cellulose acylate are substituted with acyl groups. The degree of substitution is determined from a ratio of a peak integral of a cellulose-derived hydrogen to a peak integral of an acyl group-derived hydrogen with $^1$H-NMR (JMN-ECA, manufactured by JEOL RESONANCE).

[Thermoplastic Elastomer (B): Component (B)]

The thermoplastic elastomer (B) is, for example, a thermoplastic elastomer having elasticity at ordinary temperature (25° C.), and having the same softening property as thermoplastic resin at a high temperature.

Examples of the thermoplastic elastomer (B) include:

a polymer (b1) having core-shell structure, the polymer (b1) having a core layer and a shell layer containing a polymer of an alkyl (meth)acrylate on a surface of the core layer; an olefin polymer (b2) being a polymer of an α-olefin and an alkyl (meth)acrylate, the olefin polymer (b2) containing 60 mass % or more of a structural unit derived from the α-olefin;

a polymer (b3) having a core-shell structure, the polymer (b3) having a core layer containing a butadiene polymer, and a shell layer containing a polymer selected from a styrene polymer or an acrylonitrile-styrene polymer on a surface of the core layer;

a styrene-ethylene-butadiene-styrene copolymer (b4);

a polyurethane (b5); and a polyester (b6).

The thermoplastic elastomer (B) is preferably the polymer (b1) having a core-shell structure or the olefin polymer (b2), from the viewpoint of likeliness to obtain improving effect of tensile strength.

—Polymer (b1) Having a Core-Shell Structure: Component (b1)—

The polymer (b1) having a core-shell structure is a polymer having a core-shell structure that includes a core layer and a shell layer on the surface of the core layer.

The polymer (b1) having a core-shell structure is a polymer in which the core layer is set as an innermost layer and the shell layer is set as an outermost layer (specifically, a polymer in which the shell layer is obtained by graft-polymerizing a polymer of an alkyl (meth)acrylate on a polymer as the core layer).

One or more other layers (for example, 1 to 6 other layers) may be provided between the core layer and the shell layer. In a case where other layers are provided between the core layer and the shell layer, the polymer (b1) having a core-shell structure is a polymer in which a plurality of polymers are graft-polymerized to form a multilayered polymer on a polymer to be the core layer.

The core layer is not particularly limited, but is preferably a rubber layer. Examples of the rubber layer include layers of (meth)acrylic rubber, silicone rubber, styrene rubber, conjugated diene rubber, α-olefin rubber, nitrile rubber, urethane rubber, polyester rubber, polyamide rubber, and a copolymer rubber of two or more thereof. Among them, the rubber layer is preferably a layer of (meth)acrylic rubber, silicone rubber, styrene rubber, conjugated diene rubber, α-olefin rubber, or a copolymer rubber of two or more thereof. The rubber layer may also be a rubber layer obtained by copolymerizing a crosslinking agent (divinylbenzene, allyl acrylate, butylene glycol diacrylate, or the like).

Examples of the (meth)acrylic rubber include a polymer rubber obtained by polymerizing a (meth)acrylic component (for example, an alkyl (meth)acrylate in which the alkyl has 2 to 8 carbon atoms).

Examples of the silicone rubber include a rubber composed of a silicone component (polydimethyl siloxane, polyphenylsiloxane, or the like).

Examples of the styrene rubber include a polymer rubber obtained by polymerizing a styrene component (styrene, α-methylstyrene, or the like).

Examples of the conjugated diene rubber include a polymer rubber obtained by polymerizing a conjugated diene component (butadiene, isoprene, or the like).

Examples of the α-olefin rubber include a polymer rubber obtained by polymerizing an α-olefin component (ethylene, propylene, 2-methylpropylene).

Examples of the copolymer rubber include a copolymer rubber obtained by polymerizing two or more (meth)acrylic components, a copolymer rubber obtained by polymerizing a (meth)acrylic component and a silicone component, and a copolymer of a (meth)acrylic component, a conjugated diene component, and a styrene component.

In the polymer constituting the shell layer, examples of the alkyl (meth)acrylate include methyl (meth)acrylate, ethyl (meth)acrylate, n-propyl (meth)acrylate, n-butyl (meth)acrylate, t-butyl (meth)acrylate, n-hexyl (meth)acrylate, 2-ethylhexyl (meth)acrylate, cyclohexyl (meth)acrylate, octadecyl (meth)acrylate, or the like. In the alkyl (meth)acrylate, at least a part of hydrogen of the alkyl chain may be substituted. Examples of the substituent of the hydrogen include an amino group, a hydroxy group, a halogen group, or the like.

Among these, the polymer of the alkyl (meth)acrylate is preferably a polymer of an alkyl (meth)acrylate in which an alkyl chain has 1 to 8 carbon atoms, more preferably a polymer of an alkyl (meth)acrylate in which an alkyl chain has 1 or 2 carbon atoms, and still more preferably a polymer of an alkyl (meth)acrylate in which an alkyl chain has 1 carbon atom, from the viewpoint of likeliness of obtaining an effect of improving the tensile strength.

The polymer constituting the shell layer may be a polymer obtained by polymerizing at least one selected from a glycidyl group-containing vinyl compound or an unsaturated dicarboxylic acid anhydride in addition to the alkyl (meth)acrylate.

Examples of the glycidyl group-containing vinyl compound include glycidyl (meth)acrylate, glycidyl itaconate, glycidyl itaconate, allyl glycidyl ether, styrene-4-glycidyl ether, and 4-glycidyl styrene.

Examples of the unsaturated dicarboxylic acid anhydride include maleic anhydride, itaconic anhydride, glutaconic anhydride, citraconic anhydride, and aconitic anhydride. Among these, maleic anhydride is preferable.

In a case where another layer exists between the core layer and the shell layer, examples of the other layer include the layer including the polymer described with respect to the shell layer.

The mass proportion of the shell layer is preferably from 1 mass % to 40 mass %, more preferably from 3 mass % to 30 mass %, and still more preferably from 5 mass % to 15 mass %, with respect to the entire core-shell structure.

An average primary particle diameter of the polymer having a core-shell structure is not particularly limited, but is preferably from 50 nm to 500 nm, more preferably from 50 nm to 400 nm, still more preferably from 100 nm to 300 nm, and particularly preferably 150 nm to 250 nm, from the viewpoint of likeliness of obtaining an effect of improving the tensile strength.

The average primary particle diameter refers to a value measured by the following method. The average primary particle diameter is obtained by: observing particles with a scanning electron microscope; setting the maximum diameter of a primary particle as the primary particle diameter; and measuring primary particle diameters of 100 particles, and averaging the total value of the primary particle diameters. Specifically, the average primary particle diameter is determined by observing a dispersion form of the polymer having a core-shell structure in the resin composition with the scanning electron microscope.

The polymer (b1) having a core-shell structure may be manufactured by a known method.

Examples of the known method include emulsion polymerization. Specific examples of the manufacturing method include the following method. First, a mixture of monomers is emulsified and polymerized to form core particles (core layer), and then another mixture of monomers is emulsified and polymerized in the presence of the core particles (core layer) to form a polymer having a core-shell structure that forms a shell layer around the core particles (core layer). In a case where another layer is formed between the core layer and the shell layer, the emulsion polymerization of the other mixture of monomers is repeated to obtain a polymer having a core-shell structure composed of the core layer, the other layer, and the shell layer as targets.

Examples of commercially available products of the polymer (b1) having a core-shell structure include "META-BLEN" (registered trademark) manufactured by Mitsubishi Chemical Corporation, "KANE ACE" (registered trademark) manufactured by Kaneka Corporation, "PARALOID" (registered trademark) manufactured by Dow Chemical Japan Ltd., "STAFILOID" (registered trademark) manufactured by Aica Kogyo Co., Ltd., and "PARAFACE" (registered trademark) manufactured by Kuraray Co., ltd.

—Olefin Polymer (b2): Component (b2)—

The olefin polymer (b2) is preferably an olefin polymer being a polymer of an α-olefin and an alkyl (meth)acrylate, the olefin polymer containing 60 mass % or more of a structural unit derived from the α-olefin.

In the olefin polymer, examples of the α-olefin include ethylene, propylene, 2-methylpropylene, or the like. The α-olefin is preferably an α-olefin having 2 to 8 carbon atoms, and more preferably an α-olefin having 2 or 3 carbon atoms, from the viewpoint of likeliness to obtain improving effect of tensile strength. Among these, ethylene is still more preferable.

Examples of the alkyl (meth)acrylate polymerized with the α-olefin include methyl (meth)acrylate, ethyl (meth)acrylate, n-propyl (meth)acrylate, n-butyl (meth)acrylate, t-butyl (meth)acrylate, n-hexyl (meth)acrylate, 2-ethylhexyl (meth)acrylate, cyclohexyl (meth)acrylate, octadecyl (meth) acrylate, or the like. The alkyl (meth)acrylate is preferably an alkyl (meth)acrylate in which an alkyl chain has 1 to 8 carbon atoms, more preferably an alkyl (meth)acrylate in which an alkyl chain has 1 to 4 carbon atoms, and still more preferably an alkyl (meth)acrylate in which an alkyl chain has 1 or 2 carbon atoms, from the viewpoint of likeliness of obtaining an effect of improving the tensile strength.

The olefin polymer is preferably a polymer of ethylene and methyl acrylate, from the viewpoint of likeliness of obtaining an effect of improving the tensile strength.

The olefin polymer preferably contains 60 mass % to 97 mass %, and more preferably 70 mass % to 85 mass % of the structural unit derived from the α-olefin, from the viewpoint of likeliness of obtaining an effect of improving the tensile strength.

The olefin polymer may have a structural unit other than the structural unit derived from the α-olefin and the structural unit derived from the alkyl (meth)acrylate. The other structural units is preferably 10 mass % or less with respect to all the structural units in the olefin polymer.

—Polymer (b3) Having a Core-Shell Structure: Component (b3)—

The polymer (b3) having a core-shell structure is a polymer having a core-shell structure that includes a core layer and a shell layer on the surface of the core layer.

The polymer (b3) having a core-shell structure is a polymer in which the core layer is set as an innermost layer and the shell layer is set as an outermost layer (specifically, a polymer in which the shell layer is obtained by graft-polymerizing a styrene polymer or an acrylonitrile-styrene polymer on the core layer containing a butadiene polymer).

One or more other layers (for example, 1 to 6 other layers) may be provided between the core layer and the shell layer. In a case where other layers are provided between the core layer and the shell layer, the polymer (b3) having a core-shell structure is a polymer in which a plurality of polymers are graft-polymerized to form a multilayered polymer on a polymer to be the core layer.

The core layer containing the butadiene polymer is not particularly limited as long as the butadiene polymer is obtained by polymerizing components containing butadiene. The core layer may contain a homopolymer of butadiene, or may contain a copolymer of butadiene and other monomers.

In a case where the core layer is a copolymer of butadiene and other monomers, examples of the other monomers include a vinyl aromatic monomer. The vinyl aromatic monomer is preferably a styrene component (for example, styrene, alkyl-substituted styrene (for example, α-methylstyrene, 2-methylstyrene, 3-methylstyrene, 4-methylstyrene, 2-ethylstyrene, 3-ethylstyrene, 4-ethylstyrene, or the like), or a halogen-substituted styrene (for example, 2-chlorostyrene, 3-chlorostyrene, 4-chlorostyrene, or the like)). One type of the styrene component may be used alone, or two or more types of the styrene component may be used in combination. Among the styrene component, styrene is preferably used. Polyfunctional monomers such as allyl (meth)acrylate, triallyl isocyanurate, and divinylbenzene may be used as the other monomers.

Specifically, the core layer containing the butadiene polymer may be, for example, a homopolymer of butadiene, a copolymer of butadiene and styrene, or a terpolymer of butadiene, styrene and divinylbenzene.

The butadiene polymer contained in the core layer preferably contains 60 mass % to 100 mass % (preferably 70 mass % to 100 mass %) of constitutional units derived from butadiene, and 0 mass % to 40 mass % (preferably 0 mass % to 30 mass %) of constitutional units derived from other monomers (preferably styrene components). For example, the proportion of the constitutional units which are derived from each monomer constituting the butadiene polymer preferably satisfies the followings: the content of butadiene is 60 mass % to 100 mass %; the content of styrene is 0 mass % to 40 mass %; and the content of divinylbenzene is preferably 0% to 5% with respect to the total amount of styrene and divinylbenzene.

The shell layer containing the styrene polymer is not particularly limited as long as the shell layer contains a polymer obtained by polymerizing styrene components. The shell layer may contain a homopolymer of styrene, or may contain a copolymer of styrene and other monomers. Examples of the styrene component include components similar to the styrene component exemplified in the core layer. Examples of the other monomers include alkyl (meth) acrylates (for example, methyl (meth)acrylate, ethyl (meth) acrylate, n-propyl (meth)acrylate, n-butyl (meth)acrylate, t-butyl (meth)acrylate, n-hexyl (meth)acrylate, 2-ethylhexyl (meth)acrylate, cyclohexyl (meth)acrylate, octadecyl (meth) acrylate), or the like. In the alkyl (meth)acrylate, at least a part of hydrogen of the alkyl chain may be substituted. Examples of the substituent of the hydrogen include an amino group, a hydroxy group, a halogen group, or the like. One type of alkyl (meth)acrylate may be used alone, or two or more types of alkyl (meth)acrylate may be used in combination. Polyfunctional monomers such as allyl (meth) acrylate, triallyl isocyanurate, and divinylbenzene may be used as the other monomers. The styrene polymer contained in the shell layer is preferably a copolymer in which the content of the styrene component is from 85 mass % to 100 mass %, and the content of other monomer components (preferably, alkyl (meth)acrylate) is from 0 mass % to 15 mass %.

Among styrene polymers, the styrene polymer contained in the shell layer is preferably a copolymer of styrene and alkyl (meth)acrylate, from the viewpoint of likeliness to obtain improving effect of tensile strength. From the same viewpoint, a copolymer of styrene and an alkyl (meth) acrylate in which an alkyl chain has 1 to 8 carbon atoms is preferable, and a polymer of an alkyl (meth)acrylate in which an alkyl chain has 1 to 4 carbon atoms is more preferable.

The shell layer containing an acrylonitrile-styrene polymer contains a copolymer of an acrylonitrile component and a styrene component. The acrylonitrile-styrene polymer is not particularly limited, and examples thereof include known acrylonitrile-styrene polymers. The acrylonitrile-styrene polymer may be, for example, a copolymer of 10 mass % to 80 mass % of the acrylonitrile component and 20 mass % to 90 mass % of the styrene component. Examples of the styrene component copolymerized with the acrylonitrile component include components similar to the styrene component exemplified in the core layer. Polyfunctional monomers such as allyl (meth)acrylate, triallyl isocyanurate, and divinylbenzene may also be used to the acrylonitrile-styrene polymer contained in the shell layer.

In a case where another layer exists between the core layer and the shell layer, examples of the other layer include the layer including the polymer described with respect to the shell layer.

The mass proportion of the shell layer is preferably from 1 mass % to 40 mass %, more preferably from 3 mass % to 30 mass %, and still more preferably from 5 mass % to 15 mass %, with respect to the entire core-shell structure.

Among components (b3), examples of commercially available products of the polymer (b3) having a core-shell structure that includes a core layer containing a butadiene polymer and a shell layer containing a styrene polymer on the surface of the core layer include, for example, "METABLEN" (registered trademark) manufactured by Mitsubishi Chemical Corporation, "KANE ACE" (registered trademark) manufactured by Kaneka Corporation, "CLEARSTRENGTH" (registered trademark) manufactured by Arkema, and "PARALOID" (registered trademark) manufactured by Dow Chemical Japan Ltd.

In addition, among components (b3), examples of commercially available products of the polymer (b3) having a core-shell structure that includes a core layer containing a butadiene polymer and a shell layer containing an acrylonitrile-styrene polymer on the surface of the core layer include "BLENDEX" (registered trademark) manufactured by Galata Chemicals, "ELIX" manufactured by ELIX POLYMERS, or the like.

—Styrene-Ethylene-Butadiene-Styrene Copolymer (b4): Component (b4)—

The copolymer (b4) is not particularly limited as long as the copolymer (b4) is a thermoplastic elastomer, and examples thereof include a known styrene-ethylene-butadiene-styrene copolymer. The copolymer (b4) may be a styrene-ethylene-butadiene-styrene copolymer and a hydrogenated product thereof.

The copolymer (b4) is preferably a hydrogenated product of a styrene-ethylene-butadiene-styrene copolymer, from the viewpoint of likeliness to obtain improving effect of tensile strength. From the same viewpoint, the copolymer (b4) may be a block copolymer, for example, preferably a copolymer including blocks at both ends containing styrene moieties, and a center block containing ethylene/butylene moieties (styrene-ethylene/butylene-styrene triblock copolymer), which is obtained by hydrogenating at least a part of double bonds of butadiene moieties. The ethylene/butylene block moiety of the styrene-ethylene/butylene-styrene copolymer may be a random copolymer.

The copolymer (b4) can be obtained by a known method. In a case where the copolymer (b4) is a hydrogenated product of a styrene-ethylene-butadiene-styrene copolymer, for example, the copolymer (b4) can be obtained by hydrogenating a butadiene moiety of a styrene-butadiene-styrene block copolymer in which a conjugated diene portion is composed of 1,4 bonds.

Examples of commercially available products of the copolymer (b4) include "KRATON" (registered trademark) manufactured by Clayton Co., Ltd., "SEPTON" (registered trademark) manufactured by Kuraray Co., ltd., or the like.

—Polyurethane (b5): Component (b5)—

The polyurethane (b5) is not particularly limited as long as the polyurethane (b5) is a thermoplastic elastomer, and examples thereof include known polyurethane. The polyurethane (b5) is preferably a linear polyurethane. The polyurethane (b5) is obtained by, for example, reacting a polyol component (polyether polyol, polyester polyol, polycarbonate polyol, or the like) with an organic isocyanate component (aromatic diisocyanate, aliphatic (including alicyclic) diisocyanate, or the like), and with a chain extender (aliphatic (including alicyclic) diol or the like) if necessary. One type of the polyol component and of the organic isocyanate component may be used alone, or two or more types thereof may be used in combination, respectively.

The polyurethane (b5) is preferably aliphatic polyurethane, from the viewpoint of likeliness of obtaining an effect of improving the tensile strength. The aliphatic polyurethane is preferably obtained by, for example, reacting a polyol component containing polycarbonate polyol with an isocyanate component containing aliphatic diisocyanate.

The polyurethane (b5) may be obtained by, for example, reacting the polyol component with the organic isocyanate component so that a value of an NCO/OH ratio of the raw materials in synthesis of the polyurethane falls into a range of 0.90 to 1.5. The polyurethane (b5) can be obtained by a known method such as a one-shot method, and a prepolymerization method.

Examples of commercially available products of the polyurethane (b5) include "ESTANE" (registered trademark) manufactured by Lubrizol Co., Ltd., "ELASTOLLAN" (registered trademark) manufactured by BASF AG, or the like. Examples thereof also include "DESMOPAN" (registered trademark) manufactured by Bayer Corporation.

—Polyester (b6): Component (b6)—

The polyester (b6) is not particularly limited as long as the aromatic polyester (b6) is a thermoplastic elastomer, and examples thereof include a known polyester. The polyester (b6) is preferably an aromatic polyester, from the viewpoint of likeliness of obtaining an effect of improving the tensile strength. In the exemplary embodiment, the aromatic polyester represents a polyester having an aromatic ring in a structure thereof.

Examples of the polyester (b6) include a polyester copolymer (polyether ester, polyester ester, or the like). Specific examples of the polyester (b6) include: a polyester copolymer having a hard segment composed of a polyester unit and a soft segment composed of a polyester unit; a polyester copolymer having a hard segment composed of a polyester unit and a soft segment composed of a polyether unit; and a polyester copolymer having a hard segment composed of a polyester unit and a soft segment composed of a polyether unit and a polyester unit. The mass ratio of the hard segment to the soft segment of the polyester copolymer (hard segment/soft segment) is, for example, preferably from 20/80 to 80/20. The polyester unit constituting the hard segment and the polyester unit and the polyether unit constituting the soft segment may be either aromatic or aliphatic (including alicyclic).

The polyester copolymer as the polyester (b6) can be obtained by a known method. The polyester copolymer is preferably a linear polyester copolymer. The polyester copolymer can be obtained by: a method of esterifying or transesterifying a dicarboxylic acid component having 4 to 20 carbon atoms, a diol component having 2 to 20 carbon atoms, and a polyalkylene glycol component having a number average molecular weight of 300 to 20,000 (containing an alkylene oxide adduct of the polyalkylene glycol); and a method of polycondensating oligomers that are produced by esterifying or transesterifying these components. Other examples include a method of esterifying or transesterifying a dicarboxylic acid component having 4 to 20 carbon atoms, a diol component having 2 to 20 carbon atoms, and an aliphatic polyester component having a number average molecular weight of 300 to 20,000. The dicarboxylic acid component is an aromatic or aliphatic dicarboxylic acid or an ester derivative thereof. The diol component is an aromatic or aliphatic diol. The polyalkylene glycol component is an aromatic or aliphatic polyalkylene glycol.

Among these components, a dicarboxylic acid component having an aromatic ring is preferably used as the dicarboxylic acid component of the polyester copolymer, from the viewpoint of likeliness to obtain improving effect of tensile strength. In addition, an aliphatic diol component and an aliphatic polyalkylene glycol component are preferably used as the diol component and the polyalkylene glycol component, respectively.

Examples of commercially available products of the polyester (b6) include "PELPRENE" (registered trademark) manufactured by Toyobo Co., Ltd., and "HYTREL" (registered trademark) manufactured by Du Pont-Toray Co., Ltd.

[Fiber (C): Component (C)]

The fiber (C) is not particularly limited, and examples thereof include a cellulose fiber, a kenaf fiber, a glass fiber, a carbon fiber, a polyester fiber, a polyamide fiber, an aramid fiber, a polyurethane fiber, an acrylic fiber, a vinylon fiber, and a polyethylene fiber.

One type of fiber (C) may be used alone, or two or more types of fiber (C) may be used in combination.

The average length of the fiber (C) is, for example, 0.5 mm to 50 mm, and preferably 1 mm to 10 mm. The average length of the fiber (C) is an arithmetic average of respective lengths of 100 randomly selected fibers (C).

The average diameter of the fiber (C) is, for example, 1 µm to 100 µm, and preferably µm to 50 µm. The average diameter of the fiber (C) is an arithmetic average of respective diameters of 100 randomly selected fibers (C).

As an aspect of the fiber (C), examples include a fiber (C) having a hydroxy group on a surface thereof. A resin composition and a resin molded article containing the fiber (C) having a hydroxy group on the surface thereof and the cellulose acylate (A) are likely to obtain an effect of improving the tensile strength due to addition of the component (B) or the component (D). It is assumed that since the melted cellulose acylate (A) exhibits high wettability to the fiber (C) having a hydroxy group on the surface thereof, when being kneaded, a shear stress applied to the cellulose acylate (A) is likely to be transferred to the fiber (C), and cutting of the fiber (C) is likely to occur. However, due to addition of the component (B), the shearing stress is unlikely to be transmitted to the fiber (C), and cutting of the fiber (C) is prevented.

Examples of the fiber (C) having a hydroxy group on the surface thereof include at least one selected from the group consisting of a glass fiber and a cellulose fiber.

[Cardanol compound (D): Component (D)]

The cardanol compound refers to a component contained in a naturally derived compound containing a cashew as a raw material (for example, a compound represented by the following structural formulae (d-1) to (d-4)), or a derivative from the component.

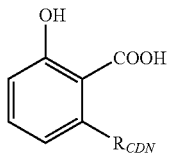
(d-1)

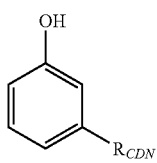
(d-2)

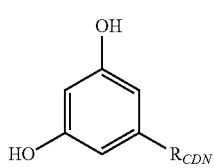
(d-3)

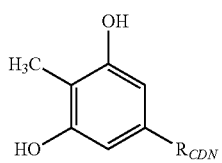
(d-4)

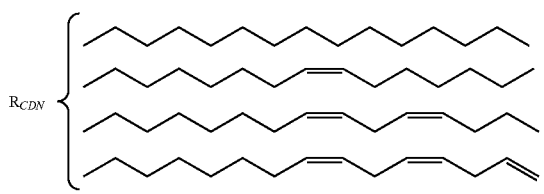

The resin composition according to the exemplary embodiment may contain a mixture of naturally derived compounds that are derived from cashews (hereinafter referred to as "cashew-derived mixture") as the cardanol compound (D).

The resin composition according to the exemplary embodiment may contain derivatives from the cashew-derived mixture as a cardanol compound (D). Examples of the derivatives from the cashew-derived mixture include the following mixtures, monomers, or the like.

A mixture obtained by adjusting a composition ratio of each component in a cashew-derived mixture;

A monomer obtained by isolating only a specific component from a cashew-derived mixture;

A mixture containing a modified product obtained by modifying components in a cashew-derived mixture;

A mixture containing a polymer obtained by polymerizing components in a cashew-derived mixture;

A mixture containing a modified polymer obtained by modifying and polymerizing components in a cashew-derived mixture;

A mixture containing a modified product obtained by further modifying components in a mixture of which the composition ratio is adjusted;

A mixture containing a polymer obtained by further polymerizing components in a mixture of which the composition ratio is adjusted;

A mixture containing a modified polymer obtained by further modifying and polymerizing components in a mixture of which the composition ratio is adjusted;

A modified product obtained by further modifying the isolated monomer;

A polymer obtained by further polymerizing the isolated monomer;

A modified polymer obtained by further modifying and polymerizing the isolated monomer.

Here, the monomer includes a multimer such as a dimer and a trimer.

The cardanol compound (D) is preferably at least one selected from the group consisting of a compound represented by a general formula (CDN1) and a polymer obtained by polymerizing the compound represented by the general formula (CDN1), from the viewpoint of the impact resistance of the resin molded article.

General formula (CDN1)

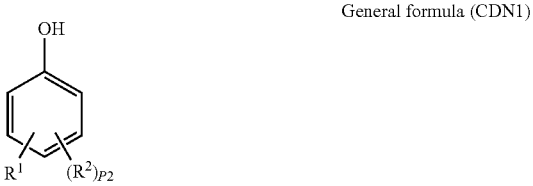

In the general formula (CDN1), $R^1$ represents an alkyl group that may have a substituent, or an unsaturated aliphatic group that has a double bond and may have a substituent. $R^2$ represents a hydroxy group, a carboxy group, an alkyl group that may have a substituent, or an unsaturated aliphatic group that has a double bond and may have a substituent. P2 represents an integer of 0 to 4. In a case where P2 is 2 or more, a plurality of $R^2$s may be the same group or different groups.

In the general formula (CDN1), the alkyl group represented by $R^1$ that may have a substituent is preferably an alkyl group having 3 to 30 carbon atoms, more preferably an alkyl group having 5 to 25 carbon atoms, and still more preferably an alkyl group having 8 to 20 carbon atoms.

Examples of the substituent include: a hydroxy group; an ether bond-containing substituent such as an epoxy group and a methoxy group; and an ester bond-containing substituent such as an acetyl group and a propionyl group.

Examples of the alkyl group that may have a substituent include a pentadecane-1-yl group, a heptane-1-yl group, an octane-1-yl group, a nonane-1-yl group, a decane-1-yl group, an undecane-1-yl group, a dodecane-1-yl group, a tetradecane-1-yl group, or the like.

In the general formula (CDN1), the unsaturated aliphatic group represented by the $R^1$, which has a double bond and may have a substituent, is preferably an unsaturated aliphatic group having 3 to 30 carbon atoms, more preferably an unsaturated aliphatic group having 5 to 25 carbon atoms, and still more preferably an unsaturated aliphatic group having 8 to 20 carbon atoms.

The number of double bonds contained in the unsaturated aliphatic group is preferably 1 to 3.

Examples of the substituent of the unsaturated aliphatic group are similar to the examples of the substituent of the alkyl group.

Examples of the unsaturated aliphatic group, which has a double bond and may have a substituent, include a pentadeca-8-en-1-yl group, a pentadeca-8,11-diene-1-yl group, a pentadeca-8,11,14-trien-1-yl group, a pentadeca-7-en-1-yl group, a pentadeca-7,10-diene-1-yl group, a pentadeca-7,10,14-trien-1-yl group, or the like.

In the general formula (CDN1), $R^1$ is preferably a pentadeca-8-en-1-yl group, a pentadeca-8,11-diene-1-yl group, a pentadeca-8,11,14-trien-1-yl group, a pentadeca-7-en-1-yl group, a pentadeca-7,10-diene-1-yl group, a pentadeca-7,10,14-trien-1-yl group, or the like.

In the general formula (CDN1), preferable examples of the alkyl group that may have a substituent and the unsaturated aliphatic group that has a double bond and may have a substituent, which are represented by $R^2$, are similar to the preferable examples of the alkyl group that may have a substituent and the unsaturated aliphatic group that has a double bond and may have a substituent, which are represented by $R^1$.

The compound represented by the formula (CDN1) may be further modified. For example, the compound represented by the formula (CDN1) may be epoxidized, specifically, may be a compound having a structure in which a hydroxy group of the compound represented by the formula (CDN1) is replaced with the following group (EP), that is, a compound represented by the following general formula (CDN1-e).

Group (EP)

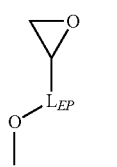

General formula (CDN1-e)

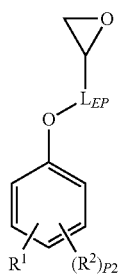

In the group (EP) and the general formula (CDN1-e), $L_{EP}$ represents a single bond or a divalent linking group. The definitions of $R^1$, $R^2$ and P2 in the general formula (CDN1-e) are respectively the same as those of $R^1$, $R^2$ and P2 in the general formula (CDN1).

In the group (EP) and the general formula (CDN1-e), examples of the divalent linking group represented by $L_{E}P$ include an alkylene group that may have a substituent (preferably an alkylene group having 1 to 4 carbon atoms, more preferably an alkylene group having 1 carbon atom), —CH$_2$CH$_2$OCH$_2$CH$_2$— group, or the like.

Examples of the substituent are similar to the examples of the substituent in $R^1$ of the general formula (CDN1).

$L_{EP}$ is preferably a methylene group.

The polymer obtained by polymerizing the compound represented by the general formula (CDN1) refers to a polymer obtained by polymerizing at least two compounds represented by the general formula (CDN1) via or without via a linking group.

Examples of the polymer obtained by polymerizing the compound represented by the general formula (CDN1) include a compound represented by the following general formula (CDN2).

General formula (CDN2)

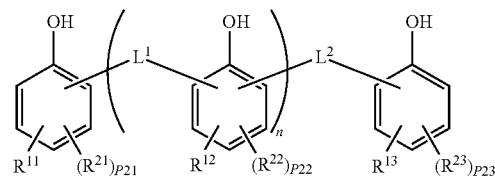

In the general formula (CDN2), $R^{11}$, $R^{12}$ and $R^{13}$ each independently represent an alkyl group that may have a substituent, or an unsaturated aliphatic group that has a double bond and may have a substituent. $R^{21}$, $R^{22}$, and $R^{23}$ each independently represent a hydroxy group, a carboxy group, an alkyl group that may have a substituent, or an unsaturated aliphatic group that has a double bond and may have a substituent. P21 and P23 each independently represent an integer of 0 to 3, and P22 represents an integer of 0 to 2. $L^1$ and $L^2$ each independently represent a divalent linking group. The symbol n represents an integer of 0 to 10. A plurality of $R^{21}$s in a case where P21 is 2 or more, a plurality of $R^{22}$s in a case where P22 is 2 or more, and a plurality of $R^{23}$s in a case where P23 is 2 or more may be the same group or different groups, respectively. In a case where n is 2 or more, a plurality of $R^{12}$s, $R^{22}$s, and $L^1$s may be the same group or different groups, respectively. A plurality of P22s in a case where n is 2 or more may be the same number or different numbers.

Preferable examples of the alkyl group that may have a substituent and the unsaturated aliphatic group that has a double bond and may have a substituent, which are represented by $R^{11}$, $R^{12}$, $R^{13}$, $R^{21}$, $R^{22}$, and $R^{23}$ in the general formula (CDN2), are similar to the preferable examples of $R^1$ in the general formula (CDN1).

Examples of the divalent linking group represented by $L^1$ and $L^2$ in the general formula (CDN2) include an alkylene group that may have a substituent (preferably an alkylene group having 2 to 30 carbon atoms, more preferably an alkylene group having 5 to 20 carbon atoms), or the like.

Examples of the substituent are similar to the examples of the substituent in $R^1$ of the general formula (CDN1).

In the general formula (CDN2), n is preferably 1 to 10, and more preferably 1 to 5.

The compound represented by the formula (CDN2) may be further modified. For example, the compound represented by the formula (CDN2) may be epoxidized, specifically, a compound having a structure in which a hydroxy group of the compound represented by the formula (CDN2) is replaced with the following group (EP), that is, a compound represented by the following general formula (CDN2-e).

General formula (CDN2-e)

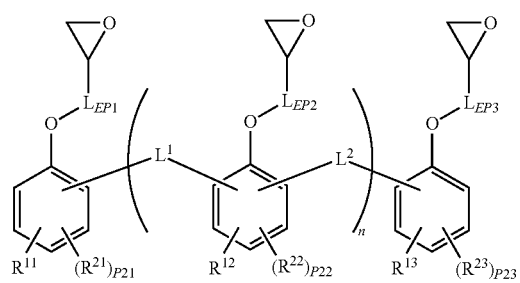

The definitions of $R^{11}$, $R^{12}$, $R^{13}$, $R^{21}$, $R^{22}$, $R^{23}$, P21, P22, P23, $L^1$, $L^2$, and n in the general formula (CDN2-e) are respectively the same as those of $R^{11}$, $R^{12}$, $R^{13}$, $R^{21}$, $R^{22}$, $R^{23}$, P21, P22, P23, $L^1$, $L^2$, and n in the general formula (CDN2).

In the general formula (CDN2-e), $L_{EP1}$, $L_{EP2}$, and $L_{EP3}$ each independently represent a single bond or a divalent linking group. In a case where n is 2 or more, a plurality of $L_{EP2}$s may be the same group or different groups.

Preferable examples of divalent linking groups represented by $L_{EP1}$, $L_{EP2}$, and $L_{EP3}$ in the general formula (CDN2-e) are similar to the preferable examples of the divalent linking group represented by $L_EP$ in the general formula (CDN1-e).

The polymer obtained by polymerizing the compound represented by the general formula (CDN1) may be, for example, a polymer obtained by three-dimensionally crosslinking and polymerizing at least three or more compounds represented by the general formula (CDN1) via or without via a linking group. Examples of the polymer obtained by three-dimensionally crosslinking and polymerizing the compounds represented by the general formula (CDN1) include, for example, a compound represented by the following structural formula.

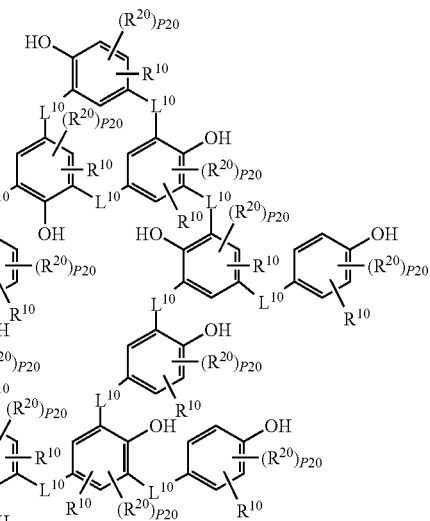

The definitions of $R^{10}$, $R^{20}$ and P20 in the above-described structural formula are respectively the same as those of $R^1$, $R^2$ and P2 in the general formula (CDN1). $L^{10}$ represents a single bond or a divalent linking group. A plurality of $R^{10}$s, $R^{20}$s and $L^{10}$s may be the same group or different groups, respectively. A plurality of P20s may be the same number or different numbers.

Examples of the divalent linking group represented by $L^{10}$ in the structural formula include an alkylene group that may have a substituent (preferably an alkylene group having 2 to 30 carbon atoms, more preferably an alkylene group having 5 to 20 carbon atoms), or the like.

Examples of the substituent are similar to the examples of the substituent in $R^1$ of the general formula (CDN1).

The compound represented by the above-described structural formula may be further modified, and, for example, may be epoxidized. Specifically, the compound represented by the above-described structural formula may be a compound having a structure in which a hydroxy group of the compound represented by the above-described structural formula is replaced with a group (EP), for example, a compound represented by the following structural formula, that is, a polymer obtained by three-dimensionally crosslinking and polymerizing the compound represented by the general formula (CDN1-e).

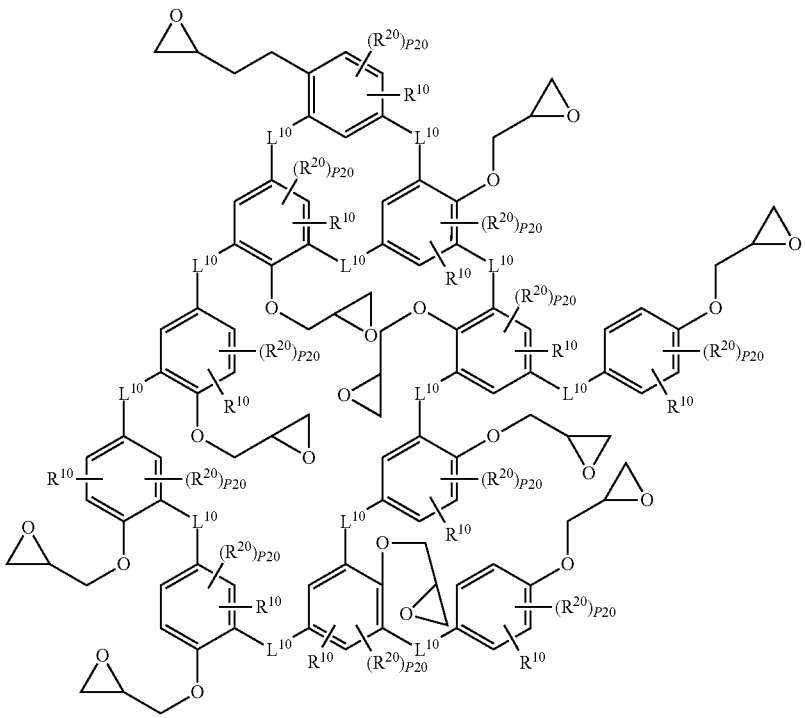

The definitions of $R^{10}$, $R^{20}$ and P20 in the above-described structural formula are respectively the same as those of $R^1$, $R^2$ and P2 in the general formula (CDN1-e). $L^{10}$ represents a single bond or a divalent linking group. A plurality of $R^{10}$s, $R^{20}$s and $L^{10}$s may be the same group or different groups, respectively. A plurality of P20s may be the same number or different numbers.

Examples of the divalent linking group represented by $L^{10}$ in the structural formula include an alkylene group that may have a substituent (preferably an alkylene group having 2 to 30 carbon atoms, more preferably an alkylene group having 5 to 20 carbon atoms), or the like.

Examples of the substituent are similar to the examples of the substituent in $R^1$ of the general formula (CDN1).

The cardanol compound (D) preferably contains a cardanol compound having an epoxy group, and more preferably is a cardanol compound having an epoxy group, from the viewpoint of improving the transparency of the resin molded article.

A commercially available product may be used as the cardanol compound (D). Examples of commercially available products include NX-2024, Ultra LITE 2023, NX-2026, GX-2503, NC-510, LITE 2020, NX-9001, NX-9004, NX-9007, NX-9008, NX-9201, NX-9203, which are manufactured by CARDOLITE Corp., LB-7000, LB-7250, CD-5L, which are manufactured by Tohoku Chemical Industries, Ltd., or the like. Examples of commercially available products of the cardanol compound having an epoxy group include NC-513, NC-514S, NC-547, LITE513E, Ultra LTE 513, which are manufactured by CARDOLITE Corp., or the like.

The hydroxyl value of the cardanol compound (D) is preferably 100 mgKOH/g or more, more preferably 120 mgKOH/g or more, and still more preferably 150 mgKOH/g or more, from the viewpoint of the impact resistance of the resin molded article. The hydroxy value of the cardanol compound is measured in accordance with the A method of ISO 14900.

In a case of being a cardanol compound having an epoxy group, the cardanol compound (D) preferably has an epoxy equivalent of 300 to 500, more preferably 350 to 480, and still more preferably 400 to 470, from the viewpoint of improving the transparency of the resin molded article. The epoxy equivalent of the cardanol compound having an epoxy group is measured in accordance with ISO3001.

The molecular weight of the cardanol compound (D) is preferably 250 to 1000, more preferably 280 to 800, and still more preferably 300 to 500, from the viewpoint of likeliness of obtaining an effect of improving the tensile strength.

One type of the cardanol compound (D) may be used alone, or two or more types of the cardanol compound (D) may be used in combination.

[Content or Content Ratio of Component (A) to Component (D)]

The resin composition according to the exemplary embodiment preferably has a content or content ratio (all in terms of mass) of each component in the following ranges, from the viewpoint of likeliness of obtaining an effect of improving the tensile strength due to addition of the component (B) or the component (D).

Abbreviations of the respective components are as follows.

Component (A)=cellulose acylate (A)
Component (B)=thermoplastic elastomer (B)
Component (C)=fiber (C)
Component (D)=cardanol compound (D)

The content of the component (A) in the resin composition according to the exemplary embodiment is preferably 50 mass % or more, more preferably 60 mass % or more, and still more preferably 65 mass % or more with respect to the total amount of the resin composition.

The content of the component (B) in the resin composition according to the exemplary embodiment is preferably from 1 mass % to 25 mass %, more preferably from 1 mass % to 15 mass %, and still more preferably from 5 mass % to 10 mass % with respect to the total amount of the resin composition.

The content of the component (C) in the resin composition according to the exemplary embodiment is preferably from 5 mass % to 50 mass %, and more preferably from 10 mass % to 30 mass %, with respect to the total amount of the resin composition.

In a case where the resin composition according to the exemplary embodiment contains the component (D), the content of the component (D) is preferably from 1 mass % to 20 mass %, more preferably from 3 mass % to 15 mass %, and still more preferably from 5 mass % to 10 mass %, with respect to the total amount of the resin composition.

The content of the component (A), the content of the component (B), and the content of the component (C) preferably satisfy the relationship of $0.02 \leq (C)/\{(A)+(B)+(C)\} \leq 0.6$, more preferably satisfy the relationship of $0.03 \leq (C)/\{(A)+(B)+(C)\} \leq 0.6$, still more preferably satisfy the relationship of $0.03 \leq (C)/\{(A)+(B)+(C)\} \leq 0.5$, and still more preferably satisfy the relationship of $0.04 \leq (C)/\{(A)+(B)+(C)\} \leq 0.5$.

The content of the component (A) and the content of the component (B) preferably satisfy the relationship of $0.02 \leq (B)/\{(A)+(B)\} \leq 0.5$, more preferably satisfy the relationship of $0.03 \leq (B)/\{(A)+(B)\} \leq 0.4$, still more preferably satisfy the relationship of $0.03 \leq (B)/\{(A)+(B)\} \leq 0.3$, and still more preferably satisfy the relationship of $0.04 \leq (B)/\{(A)+(B)\} \leq 0.3$.

In a case where the resin composition according to the exemplary embodiment contains the component (D), the content of the component (A) and the content of the component (D) preferably satisfy the relationship of $0.01 \leq (D)/\{(A)+(D)\} \leq 0.3$, and more preferably satisfy the relationship of $0.02 \leq (D)/\{(A)+(D)\} \leq 0.2$.

[Other Components]

The resin composition according to the exemplary embodiment may contain other components.

Examples of the other components include a plasticizer, a flame retardant, a compatibilizer, a releasing agent, a light stabilizer, a weathering agent, a colorant, a pigment, a modifier, an anti-drip agent, an antistatic agent, an antihydrolysis agent, a filler, a reinforcing agent (a glass fiber, a carbon fiber, a talc, a clay, a mica, a glass flake, a milled glass, glass beads, a crystalline silica, alumina, silicon nitride, aluminum nitride, boron nitride, or the like), an acid acceptor for preventing acetic acid release (an oxide such as magnesium oxide and aluminum oxide; a metal hydroxide such as magnesium hydroxide, calcium hydroxide, aluminum hydroxide, and hydrotalcite; calcium carbonate; talc; or the like), and a reactive trapping agent (for example, an epoxy compound, an acid anhydride compound, a carbodiimide, or the like).

The content of the other components is preferably from 0 mass % to 5 mass % with respect to the total amount of the resin composition. Here, "0 mass %" means that no other component is contained.

Examples of the plasticizer include an ester compound, a camphor, a metal soap, a polyol, and a poly(alkylene oxide). The plasticizer is preferably an ester compound from the viewpoint of the impact resistance of the resin molded article. One type of plasticizer may be used alone, or two or more types of plasticizer may be used in combination.

Examples of the ester compound that may be contained as the plasticizer in the resin composition according to the exemplary embodiment include an adipic acid ester, a citric acid ester, a sebacic acid ester, an azelaic acid ester, a phthalic acid ester, an acetate ester, a dibasic acid ester, a phosphoric acid ester, a condensed phosphate ester, a glycol ester (for example, benzoic acid glycol ester), a modified product of a fatty acid ester (for example, an epoxidized fatty acid ester), or the like. Examples of the esters include a monoester, a diester, a triester, a polyester, or the like. Among these, a dicarboxylic acid diester (an adipic acid diester, a sebacic acid diester, an azelaic acid diester, a phthalic diester, or the like) is preferable.

As the plasticizer, an adipic acid ester is preferable. An adipic acid ester has a high affinity with the cellulose acylate (A), and is dispersed in a state substantially uniform with respect to the cellulose acylate (A), so that the thermal fluidity is further improved as compared to other plasticizers.

A mixture of an adipic acid ester and another component may be used as the adipic acid ester. Examples of commercially available products of the mixture include DAIFATTY 101 manufactured by Daihachi Chemical Industry Co., Ltd.

Examples of the fatty acid ester such as citric acid ester, sebacic acid ester, azelaic acid ester, phthalic acid ester, and acetic acid ester include an esters of a fatty acid and an alcohol. Examples of the alcohol include: a monohydric alcohol such as methanol, ethanol, propanol, butanol, and 2-ethylhexanol; a polyhydric alcohol such as glycerin, a polyglycerol (such as diglycerin), pentaerythritol, ethylene glycol, diethylene glycol, propylene glycol, butylene glycol, trimethylolpropane, trimethylolethane, and a sugar alcohol; and the like.

Examples of the glycol in the benzoic acid glycol ester include ethylene glycol, diethylene glycol, propylene glycol, and the like.

The epoxidized fatty acid ester is an ester compound having a structure in which a carbon-carbon unsaturated bond of an unsaturated fatty acid ester is epoxidized (that is, an oxacyclopropane). Examples of the epoxidized fatty acid ester include an ester of an alcohol and a fatty acid in which a part or all of carbon-carbon unsaturated bonds of an unsaturated fatty acid (for example, oleic acid, palmitoleic acid, barcosenic acid, linoleic acid, linolenic acid, nervonic acid, or the like) is epoxidized. Examples of the alcohol include: a monohydric alcohol such as methanol, ethanol, propanol, butanol, and 2-ethylhexanol; a polyhydric alcohol such as glycerin, a polyglycerol (such as diglycerin), pentaerythritol, ethylene glycol, diethylene glycol, propylene glycol, butylene glycol, trimethylolpropane, trimethylolethane, and a sugar alcohol; and the like.

The ester compound contained as the plasticizer in the resin composition according to the exemplary embodiment preferably has a molecular weight (or weight average molecular weight) of 200 to 2000, more preferably 250 to 1500 or, and still more preferably 280 to 1000. The weight average molecular weight of the ester compound is a value measured in accordance with the method of measuring the weight average molecular weight of the cellulose acylate (A), unless otherwise specified.

The resin composition according to the exemplary embodiment may contain a resin other than the component (A), the component (B), the component (C), and the component (D). However, in a case where another resin is contained, the content of the other resin with respect to the total amount of the resin composition is preferably 5 mass % or less, and more preferably less than 1 mass %. It is more preferable that the other resin is not contained (that is, 0 mass %).

Examples of the other resin include known thermoplastic resin, and specific examples thereof include: a polycarbonate resin; a polypropylene resin; a polyester resin; a poly-olefin resin; a poly(ester carbonate) resin; a polyphenylene ether resin; a polyphenylene sulfide resin; a polysulfone resin; a polyethersulfone resin; a polyarylene resin; a polyetherimide resin; a polyacetal resin; a polyvinyl acetal resin; a polyketone resin; a polyetherketone resin; a poly(ether ether ketone) resin; a polyarylketone resin; a polyether nitrile resin; a liquid crystal resin; a polybenzimidazole resin; a polyparabanic acid resin; a vinyl based polymer or copolymer obtained by polymerizing or copolymerizing one or more vinyl monomers selected from the group consisting of an aromatic alkenyl compound, a methacrylic acid ester, an acrylic acid ester, and a vinyl cyanide compound; a diene-aromatic alkenyl compound copolymer; a vinyl cyanide-diene-aromatic alkenyl compound copolymer; an aromatic alkenyl compound-diene-cyanide vinyl-N-phenylmaleimide copolymer; a vinyl cyanide-(ethylene-diene-propylene (EPDM))-aromatic alkenyl compound copolymer; a vinyl chloride resin; a chlorinated vinyl chloride resin; or the like. These resins may be used alone or in combination of two or more thereof.

[Method for Producing Resin Composition]

Examples of a method for producing the resin composition according to the exemplary embodiment include: a method mixing and melt-kneading at least one of the component (A), the component (B), the component (C), and the component (D), and another component as necessary; a method of dissolving, in a solvent, at least one of the component (A), the component (B), the component (C), and the component (D), and another component as necessary; or the like. The melt-kneading means is not particularly limited, and examples thereof include a twin-screw extruder, a Henschel mixer, a Banbury mixer, a single-screw extruder, a multi-screw extruder, and a co-kneader.

<Resin Molded Article>

The resin molded article according to the exemplary embodiment includes the resin composition according to the exemplary embodiment. That is, the resin molded article according to the exemplary embodiment has the same formulation as the resin composition according to the exemplary embodiment.

A method for molding of the resin molded article according to the exemplary embodiment is preferably injection molding from the viewpoint of high degree of freedom in shape. Therefore, the resin molded article according to the exemplary embodiment is preferably an injection-molded article obtained by injection molding from the viewpoint of high degree of freedom in shape.

The cylinder temperature upon injection molding of the resin molded article according to the exemplary embodiment is, for example, 160° C. to 280° C., and preferably 180° C. to 240° C. The mold temperature upon injection molding of the resin molded article according to the exemplary embodiment is, for example, 40° C. to 90° C., and more preferably 40° C. to 60° C.

Injection molding of the resin molded article according to the exemplary embodiment may be performed using, for example, a commercially available apparatus such as NEX500 manufactured by Nissei Plastic Industrial Co., Ltd., NEX150 manufactured by Nissei Plastic Industrial Co., Ltd., NEX7000 manufactured by Nissei Plastic Industrial Co., Ltd., PNX40 manufactured by Nissei Plastic Industrial Co., Ltd., and SE50D manufactured by Sumitomo Machinery Corp.

The molding method for obtaining the resin molded article according to the exemplary embodiment is not limited to the injection molding described above, and may be, for example, extrusion molding, blow molding, hot press molding, calendar molding, coating molding, cast molding, a dipping molding, vacuum forming, transfer molding, or the like may be applied.

The resin molded article according to the exemplary embodiment is suitably used for applications such as electronic and electric equipment, office apparatus, home electric appliances, automobile interior materials, toys, and containers. Specific examples of application of the resin molded article according to the exemplary embodiment include: a housing of an electronic or electric device or a home electric appliance; various parts of an electronic or electric device or a home electric appliance; interior parts of automobiles; a block building toys; a plastic model kit; a storage case of CD-ROM or DVD; dishware; a beverage bottle; a Food tray; a wrapping material; a film; a sheet; or the like.

The tensile elastic modulus of the resin molded article according to the exemplary embodiment is preferably 2500 MPa or more, more preferably 3000 MPa or more, and still more preferably 3500 MPa or more.

Here, the tensile elastic modulus is a tensile elastic modulus (MPa) measured by performing a tensile test in accordance with ISO 527: 2012 using an ISO multipurpose test piece as a sample.

Examples

Hereinafter, the resin composition and the resin molded article according to the exemplary embodiment will be described in more detail with reference to Examples. Materials, amounts, ratios, treatment procedures, and the like shown in the following examples can be modified as appropriate without departing from the spirit of the present disclosure. Therefore, the resin composition and the resin molded article according to the exemplary embodiment should not be construed as being limited by the following specific examples.

<Preparation of Each Material>

The following materials were prepared.

[Cellulose Acylate (A)]

CA1: "CAP482-20", manufactured by Eastman Chemical Company, cellulose acetate propionate, weight average degree of polymerization: 716, degree of acetyl group substitution: 0.18, degree of propionyl group substitution: 2.49.

CA2: "CAP482-0.5", manufactured by Eastman Chemical Company, cellulose acetate propionate, weight average degree of polymerization: 189, degree of acetyl group substitution: 0.18, degree of propionyl group substitution: 2.49.

CA3: "CAP504-0.2", manufactured by Eastman Chemical Company, cellulose acetate propionate, weight average degree of polymerization: 133, degree of acetyl group substitution: 0.04, degree of propionyl group substitution: 2.09.

CA4: "CAB171-15", manufactured by Eastman Chemical Company, cellulose acetate butyrate, weight average degree of polymerization: 754, degree of acetyl group substitution: 2.07, degree of butyryl group substitution: 0.73.

CA5: "CAB381-20", manufactured by Eastman Chemical Company, cellulose acetate butyrate, weight average degree of polymerization: 890, degree of acetyl group substitution: 1.05, degree of butyryl group substitution: 1.74.

CA6: "CAB500-5", manufactured by Eastman Chemical Company, cellulose acetate butyrate, weight average degree of polymerization: 625, degree of acetyl group substitution: 0.17, degree of butyryl group substitution: 2.64.

CA7: "L50", manufactured by Daicel Corporation, diacetyl cellulose, weight-average degree of polymerization: 570.

CA8: "LT-35", manufactured by Daicel Corporation, triacetyl cellulose, weight-average degree of polymerization: 385.

RC1: "Tenite propionate 360A4000012", manufactured by Eastman Chemical Company, cellulose acetate propionate, weight average degree of polymerization: 716, degree of acetyl group substitution: 0.18, degree of propionyl group substitution: 2.49. The product contained dioctyl adipate corresponding to the plasticizer, in which cellulose acetate propionate was 88 mass %, and dioctyl adipate was 12 mass %.

RC2: "Treva GC6021", manufactured by Eastman Chemical Company, cellulose acetate propionate, weight average degree of polymerization: 716, degree of acetyl group substitution: 0.18, degree of propionyl group substitution: 2.49. The product contained 3 mass % to 10 mass % of a chemical substance corresponding to the component (B).

CA1 satisfied the following (2), (3), and (4). CA2 satisfied the following (4). (2) When the CAP is measured by a GPC method using tetrahydrofuran as a solvent, the weight-average molecular weight (Mw) in terms of polystyrene is from 160,000 to 250,000, a ratio of the number average molecular weight (Mn) in terms of polystyrene to the Z average molecular weight (Mz) in terms of polystyrene (Mn/Mz) is from 0.14 to 0.21, and a ratio of the weight average molecular weight (Mw) in terms of polystyrene to the Z average molecular weight (Mz) (Mw/Mz) in terms of polystyrene is from 0.3 to 0.7. (3) When the CAP is measured by capillography at 230° C. in accordance with ISO 11443: 1995, a ratio of a viscosity η1 (Pa·s) at a shear rate of 1216 (/sec) to a viscosity η2 (Pa·s) at a shear rate of 121.6 (/sec) (η1/η2) is from 0.1 to 0.3. (4) When a small square plate test piece (D11 test piece specified by JIS K7139: 2009, 60 mm×60 mm, thickness 1 mm) obtained by injection molding of the CAP was left for 48 hours in an atmosphere at a temperature of 65° C. and a relative humidity of 85%, both an expansion coefficient in a MD direction and an expansion coefficient in a TD direction are from 0.4% to 0.6%.

[Thermoplastic Elastomer (B)]

EL1: "METABLEN W-600A", manufactured by Mitsubishi Chemical Corporation, the polymer (b1) having a core-shell structure, a polymer obtained by subjecting a "homopolymer rubber of methyl methacrylate" to graft polymerization to a "copolymer rubber of 2-ethylhexyl acrylate and n-butyl acrylate" serving as the core layer so as to form a shell layer, average primary particle diameter: 200 nm.

EL2: "METABLEN S-2006", manufactured by Mitsubishi Chemical Corporation, the polymer (b1) having a core-shell structure, a polymer whose core layer is composed of a "silicone/acrylic rubber" and whose shell layer is composed of a "polymer of methyl methacrylate", average primary particle diameter: 200 nm.

EL3: "PARALOID EXL2315", manufactured by Dow Chemical Japan Ltd., the polymer (b1) having a core-shell structure, a polymer obtained by subjecting a "polymer of methyl methacrylate" to graft polymerization to a "rubber whose main component is poly(butyl acrylate)" serving as the core layer so as to form a shell layer, average primary particle diameter: 300 nm.

EL4: "LOTRYL 29MA03", manufactured by Arkema, the olefin polymer (b2), a copolymer of ethylene and methyl acrylate, which is an olefin polymer containing 71 mass % of a structural unit derived from ethylene.

EL5: "KANE ACE B-564", manufactured by Kaneka Corporation, MBS based resin, the polymer (b3) having a core-shell structure.

EL6: "BLENDEX 338", manufactured by Galata Chemicals (Artek), ABS core-shell, the polymer (b3) having a core-shell structure.

EL7: "KRATON FG1924G", manufactured by Kraton Corporation, the styrene-ethylene-butadiene-styrene copolymer (b4).

EL8: "ESTANE ALR 72A", manufactured by Lubrizol, the polyurethane (b5).

EL9: "Hytrel 3078", manufactured by Du Pont-Toray Co., Ltd., a copolymer of aromatic polyester copolymer, the polyester (b6).

[Fiber (C)]

FB1: "CORDENKA 700", manufactured by Cordenka, a rayon fiber cord, filament count: 1000, average diameter of filament: 12 μm. Used after being cut to an average length of 5 mm.

FB2: "NDP-T", manufactured by Nippon Paper Industries Co., Ltd., dissolved pulp, ca-cellulose content: 90 mass %, average diameter: 30 μm, average length: 2 mm.

FB3: "CSX-3J-451S", manufactured by Nitto Boseki Co., Ltd., glass fiber, average diameter: 11 μm, average length: 3 mm.

FB4: "ChopVantage HP3540", manufactured by Nippon Electric Glass Co., Ltd., glass fiber, average diameter: 10 μm, average length: 3 mm.

FB5: "T008 A-006", manufactured by Toray Industries, Inc., carbon fiber, average diameter: 7 μm, average length: 6 mm.

[Cardanol Compound (D)]

CN1: "NX-2026", manufactured by Cardolite, cardanol, molecular weight: 298 to 305.

CN2: "Ultra LITE 2023", manufactured by Cardolite, cardanol (acidified to stabilize the color), molecular weight: 298 to 305.

CN3: "Ultra LITE 2020", manufactured by Cardolite, hydroxyethylated cardanol, molecular weight: 343 to 349.

CN4: "GX-5170", manufactured sby Cardolite, hydroxyethylated cardanol, molecular weight: 827 to 833.

CN5: "Ultra LITE 513", manufactured by Cardolite, glycidyl ether of cardanol, molecular weight: 354 to 361.

CN6: "NC-514S", manufactured by Cardolite, a cardanol-derived bifunctional epoxy compound, molecular weight: 534 to 537.

CN6: "NC-547", manufactured by Cardolite, a cardanol-derived trifunctional epoxy compound, molecular weight: 1087 to 1106.

[Others]

PL1: "Daifatty 101", manufactured by Daihachi Chemical Industry Co., Ltd., an adipic acid ester-containing compound, molecular weight: 326 to 378.

PL2: "DOA", manufactured by Mitsubishi Chemical Corporation, dioctyl adipate, molecular weight: 371.

Production of Resin Composition, Injection Molding of Resin Molded Article Examples 1 to 83, Comparative Examples 1 to 55, and Reference Examples A and B At the feed amounts and kneading temperatures shown in Tables 1 to 7, kneading was carried out with a biaxial kneader (LTE20-44, manufactured by Labtech Engineering) to obtain pellets (resin composition). Using this pellet, at an injection peak pressure not exceeding 180 MPa, and at the molding temperatures and the mold temperatures shown in Tables 1 to 7, ISO multi-purpose test pieces (dumbbell shape, dimension of measuring part: width: 10 mm, thickness: 4 mm) were molded.

<Evaluation of Performances of Resin Molded Article>
[Tensile Elastic Modulus and Tensile Strength]

The ISO multi-purpose test pieces were placed in a universal testing device (Autograph AG-Xplus, manufactured by Shimadzu Corporation), and were subjected to a tensile test in accordance with ISO 527:2012 to determine a tensile elastic modulus (MPa) and a tensile strength (MPa) thereof. The measured values are shown in Tables 1 to 7.

TABLE 1

| | Material (quantities in terms of parts by mass) | | | | | | | | |
|---|---|---|---|---|---|---|---|---|---|
| | (A) | | (B) | | (C) | | (D) | | Others | |
| Section | Type | Quantity | Type | Quantity | Type | Quantity | Type | Quantity | Type | Quantity |
| Reference Example A | CA1 | 100 | | | | | | | | |
| Reference Example B | CA1 | 90 | EL1 | 10 | | | | | | |
| Comparative Example 1 | CA1 | 90 | | | FB1 | 25 | | | | |
| Comparative Example 2 | CA1 | 90 | | | FB1 | 3 | | | | |
| Comparative Example 3 | CA1 | 90 | | | FB1 | 5 | | | | |
| Comparative Example 4 | CA1 | 90 | | | FB1 | 100 | | | | |
| Comparative Example 5 | CA1 | 90 | | | FB1 | 120 | | | | |
| Example 1 | CA1 | 90 | EL1 | 10 | FB1 | 25 | | | | |
| Example 2 | CA1 | 90 | EL1 | 10 | FB1 | 3 | | | | |
| Example 3 | CA1 | 90 | EL1 | 10 | FB1 | 5 | | | | |
| Example 4 | CA1 | 90 | EL1 | 10 | FB1 | 100 | | | | |
| Example 5 | CA1 | 90 | EL1 | 10 | FB1 | 120 | | | | |
| Example 6 | CA1 | 97 | EL1 | 3 | FB1 | 25 | | | | |
| Example 7 | CA1 | 95 | EL1 | 5 | FB1 | 25 | | | | |
| Example 8 | CA1 | 75 | EL1 | 25 | FB1 | 25 | | | | |
| Example 9 | CA1 | 60 | EL1 | 40 | FB1 | 25 | | | | |
| Example 10 | CA1 | 90 | EL2 | 10 | FB1 | 25 | | | | |
| Example 11 | CA1 | 90 | EL3 | 10 | FB1 | 25 | | | | |
| Example 12 | CA1 | 90 | EL4 | 10 | FB1 | 25 | | | | |
| Example 13 | CA1 | 90 | EL5 | 10 | FB1 | 25 | | | | |
| Example 14 | CA1 | 90 | EL6 | 10 | FB1 | 25 | | | | |
| Example 15 | CA1 | 90 | EL7 | 10 | FB1 | 25 | | | | |
| Example 16 | CA1 | 90 | EL8 | 10 | FB1 | 25 | | | | |
| Example 17 | CA1 | 90 | EL9 | 10 | FB1 | 25 | | | | |

| Section | Composition ratio | | | Kneading temperature [° C.] | Molding temperature [° C.] | Mold temperature [° C.] | Tensile elastic modulus [MPa] | Tensile strength [MPa] |
|---|---|---|---|---|---|---|---|---|
| | C/(A + B + C) | B/(A + B) | D(A + D) | | | | | |
| Reference Example A | — | — | — | 230 | 230 | 40 | 1820 | 53 |
| Reference Example B | — | — | — | 220 | 220 | 40 | 1720 | 47 |
| Comparative Example 1 | 0.22 | 0 | 0 | 240 | 240 | 60 | 2600 | 53 |
| Comparative Example 2 | 0.03 | 0 | 0 | 230 | 230 | 60 | 1900 | 50 |
| Comparative Example 3 | 0.05 | 0 | 0 | 230 | 230 | 60 | 1900 | 51 |
| Comparative Example 4 | 0.53 | 0 | 0 | 250 | 250 | 60 | 4000 | 55 |
| Comparative Example 5 | 0.57 | 0 | 0 | 250 | 250 | 60 | 3800 | 54 |
| Example 1 | 0.2 | 0.1 | 0 | 230 | 230 | 60 | 4300 | 66 |
| Example 2 | 0.03 | 0.1 | 0 | 230 | 230 | 60 | 2700 | 55 |
| Example 3 | 0.05 | 0.1 | 0 | 230 | 230 | 60 | 3300 | 64 |
| Example 4 | 0.5 | 0.1 | 0 | 250 | 250 | 60 | 7200 | 76 |
| Example 5 | 0.55 | 0.1 | 0 | 250 | 250 | 60 | 4200 | 62 |

TABLE 1-continued

| | | | | | | | | |
|---|---|---|---|---|---|---|---|---|
| Example 6 | 0.2 | 0.03 | 0 | 240 | 240 | 60 | 3000 | 55 |
| Example 7 | 0.2 | 0.05 | 0 | 240 | 240 | 60 | 4200 | 65 |
| Example 8 | 0.2 | 0.25 | 0 | 230 | 230 | 60 | 4100 | 65 |
| Example 9 | 0.2 | 0.4 | 0 | 230 | 230 | 60 | 2900 | 57 |
| Example 10 | 0.2 | 0.1 | 0 | 230 | 230 | 60 | 4200 | 66 |
| Example 11 | 0.2 | 0.1 | 0 | 230 | 230 | 60 | 4300 | 66 |
| Example 12 | 0.2 | 0.1 | 0 | 230 | 230 | 60 | 4100 | 65 |
| Example 13 | 0.2 | 0.1 | 0 | 230 | 230 | 60 | 3500 | 57 |
| Example 14 | 0.2 | 0.1 | 0 | 230 | 230 | 60 | 3300 | 57 |
| Example 15 | 0.2 | 0.1 | 0 | 230 | 230 | 60 | 3200 | 58 |
| Example 16 | 0.2 | 0.1 | 0 | 230 | 230 | 60 | 3200 | 57 |
| Example 17 | 0.2 | 0.1 | 0 | 230 | 230 | 60 | 3500 | 58 |

TABLE 2

| | Material (quantities in terms of parts by mass) | | | | | | | | |
|---|---|---|---|---|---|---|---|---|---|
| | (A) | | (B) | | (C) | | (D) | | Others |
| Section | Type | Quantity | Type | Quantity | Type | Quantity | Type | Quantity | Type | Quantity |
| Comparative Example 6 | CA1 | 90 | | | FB3 | 25 | | | | |
| Comparative Example 7 | CA1 | 90 | | | FB3 | 3 | | | | |
| Comparative Example 8 | CA1 | 90 | | | FB3 | 5 | | | | |
| Comparative Example 9 | CA1 | 90 | | | FB3 | 100 | | | | |
| Comparative Example 10 | CA1 | 90 | | | FB3 | 120 | | | | |
| Example 18 | CA1 | 90 | EL1 | 10 | FB3 | 25 | | | | |
| Exampe 19 | CA1 | 90 | EL1 | 10 | FB3 | 3 | | | | |
| Example 20 | CA1 | 90 | EL1 | 10 | FB3 | 5 | | | | |
| Example 21 | CA1 | 90 | EL1 | 10 | FB3 | 100 | | | | |
| Example 22 | CA1 | 90 | EL1 | 10 | FB3 | 120 | | | | |
| Example 23 | CA1 | 97 | EL1 | 3 | FB3 | 25 | | | | |
| Example 24 | CA1 | 95 | EL1 | 5 | FB3 | 25 | | | | |
| Example 25 | CA1 | 75 | EL1 | 25 | FB3 | 25 | | | | |
| Example 26 | CA1 | 60 | EL1 | 40 | FB3 | 25 | | | | |
| Example 27 | CA1 | 90 | EL2 | 10 | FB3 | 25 | | | | |
| Example 28 | CA1 | 90 | EL3 | 10 | FB3 | 25 | | | | |
| Example 29 | CA1 | 90 | EL4 | 10 | FB3 | 25 | | | | |
| Example 30 | CA1 | 90 | EL5 | 10 | FB3 | 25 | | | | |
| Example 31 | CA1 | 90 | EL6 | 10 | FB3 | 25 | | | | |
| Example 32 | CA1 | 90 | EL7 | 10 | FB3 | 25 | | | | |
| Example 33 | CA1 | 90 | EL8 | 10 | FB3 | 25 | | | | |
| Example 34 | CA1 | 90 | EL9 | 10 | FB3 | 25 | | | | |

| | Composition ratio | | | Kneading temperature [° C.] | Molding temperature [° C.] | Mold temperature [° C.] | Tensile elastic modulus [MPa] | Tensile strength [MPa] |
|---|---|---|---|---|---|---|---|---|
| Section | C/(A + B + C) | B/(A + B) | D(A + D) | | | | | |
| Comparative Example 6 | 0.22 | 0 | 0 | 240 | 240 | 60 | 2700 | 59 |
| Comparative Example 7 | 0.03 | 0 | 0 | 240 | 240 | 60 | 2000 | 50 |
| Comparative Example 8 | 0.05 | 0 | 0 | 240 | 240 | 60 | 2100 | 52 |
| Comparative Example 9 | 0.53 | 0 | 0 | 250 | 250 | 60 | 4600 | 70 |
| Comparative Example 10 | 0.57 | 0 | 0 | 250 | 250 | 60 | 4800 | 71 |
| Example 18 | 0.2 | 0.1 | 0 | 240 | 240 | 60 | 5500 | 82 |
| Exampe 19 | 0.03 | 0.1 | 0 | 240 | 240 | 60 | 2800 | 60 |
| Example 20 | 0.05 | 0.1 | 0 | 240 | 240 | 60 | 4200 | 68 |
| Example 21 | 0.5 | 0.1 | 0 | 250 | 250 | 60 | 9100 | 121 |
| Example 22 | 0.55 | 0.1 | 0 | 250 | 250 | 60 | 5100 | 81 |
| Example 23 | 0.2 | 0.03 | 0 | 240 | 240 | 60 | 2900 | 62 |
| Example 24 | 0.2 | 0.05 | 0 | 240 | 240 | 60 | 5000 | 77 |
| Example 25 | 0.2 | 0.25 | 0 | 230 | 230 | 60 | 5300 | 82 |
| Example 26 | 0.2 | 0.4 | 0 | 230 | 230 | 60 | 3500 | 63 |
| Example 27 | 0.2 | 0.1 | 0 | 240 | 240 | 60 | 5300 | 83 |
| Example 28 | 0.2 | 0.1 | 0 | 240 | 240 | 60 | 5400 | 80 |
| Example 29 | 0.2 | 0.1 | 0 | 240 | 240 | 60 | 5500 | 85 |

TABLE 2-continued

| | | | | | | | | |
|---|---|---|---|---|---|---|---|---|
| Example 30 | 0.2 | 0.1 | 0 | 240 | 240 | 60 | 4000 | 65 |
| Example 31 | 0.2 | 0.1 | 0 | 240 | 240 | 60 | 3600 | 64 |
| Example 32 | 0.2 | 0.1 | 0 | 240 | 240 | 60 | 3700 | 65 |
| Example 33 | 0.2 | 0.1 | 0 | 240 | 240 | 60 | 3600 | 62 |
| Example 34 | 0.2 | 0.1 | 0 | 240 | 240 | 60 | 3900 | 66 |

TABLE 3

| | Material (quantities in terms of parts by mass) | | | | | | | | | |
|---|---|---|---|---|---|---|---|---|---|---|
| | (A) | | (B) | | (C) | | (D) | | Others | |
| Section | Type | Quantity | Type | Quantity | Type | Quantity | Type | Quantity | Type | Quantity |
| Comparative Example 11 | CA1 | 90 | | | FB2 | 25 | | | | |
| Comparative Example 12 | CA1 | 90 | | | FB4 | 25 | | | | |
| Comparative Example 13 | CA1 | 90 | | | FB5 | 25 | | | | |
| Example 35 | CA1 | 90 | EL1 | 10 | FB2 | 25 | | | | |
| Example 36 | CA1 | 90 | EL1 | 10 | FB4 | 25 | | | | |
| Example 37 | CA1 | 90 | EL1 | 10 | FB5 | 25 | | | | |
| Comparative Example 14 | CA1 | 79.2 | | | FB1 | 25 | | | PL1 | 10.8 |
| Comparative Example 15 | CA1 | 79.2 | | | FB1 | 25 | | | PL2 | 10.8 |
| Comparative Example 16 | CA1 | 79.2 | | | FB3 | 25 | | | PL1 | 10.8 |
| Comparative Example 17 | CA1 | 79.2 | | | FB3 | 25 | | | PL2 | 10.8 |
| Example 38 | CA1 | 79.2 | EL1 | 10 | FB1 | 25 | | | PL1 | 10.8 |
| Example 39 | CA1 | 79.2 | EL1 | 10 | FB1 | 25 | | | PL2 | 10.8 |
| Example 40 | CA1 | 79.2 | EL1 | 10 | FB3 | 25 | | | PL1 | 10.8 |
| Example 41 | CA1 | 79.2 | EL1 | 10 | FB3 | 25 | | | PL2 | 10.8 |

| | Composition ratio | | | Kneading temperature [° C.] | Molding temperature [° C.] | Mold temperature [° C.] | Tensile elastic modulus [MPa] | Tensile strength [MPa] |
|---|---|---|---|---|---|---|---|---|
| Section | C/(A + B + C) | B/(A + B) | D(A + D) | | | | | |
| Comparative Example 11 | 0.22 | 0 | 0 | 240 | 240 | 60 | 2600 | 53 |
| Comparative Example 12 | 0.22 | 0 | 0 | 240 | 240 | 60 | 2800 | 58 |
| Comparative Example 13 | 0.22 | 0 | 0 | 250 | 250 | 80 | 3200 | 57 |
| Example 35 | 0.2 | 0.1 | 0 | 230 | 230 | 60 | 4100 | 64 |
| Example 36 | 0.2 | 0.1 | 0 | 240 | 240 | 60 | 5400 | 80 |
| Example 37 | 0.2 | 0.1 | 0 | 250 | 250 | 80 | 3500 | 59 |
| Comparative Example 14 | 0.24 | 0 | 0 | 210 | 210 | 40 | 2200 | 49 |
| Comparative Example 15 | 0.24 | 0 | 0 | 210 | 210 | 40 | 2200 | 48 |
| Comparative Example 16 | 0.24 | 0 | 0 | 210 | 210 | 40 | 2400 | 55 |
| Comparative Example 17 | 0.24 | 0 | 0 | 210 | 210 | 40 | 2400 | 55 |
| Example 38 | 0.22 | 0.11 | 0 | 210 | 210 | 40 | 3600 | 60 |
| Example 39 | 0.22 | 0.11 | 0 | 210 | 210 | 40 | 3700 | 64 |
| Example 40 | 0.22 | 0.11 | 0 | 210 | 210 | 40 | 4200 | 69 |
| Example 41 | 0.22 | 0.11 | 0 | 210 | 210 | 40 | 4300 | 69 |

TABLE 4

| | Material (quantities in terms of parts by mass) | | | | | | | | | |
|---|---|---|---|---|---|---|---|---|---|---|
| | (A) | | (B) | | (C) | | (D) | | Others | |
| Section | Type | Quantity | Type | Quantity | Type | Quantity | Type | Quantity | Type | Quantity |
| Comparative Example 18 | CA2 | 90 | | | FB1 | 25 | | | | |
| Comparative Example 19 | CA3 | 90 | | | FB1 | 25 | | | | |
| Comparative Example 20 | CA4 | 90 | | | FB1 | 25 | | | | |
| Comparative Example 21 | CA5 | 90 | | | FB1 | 25 | | | | |
| Comparative Example 22 | CA6 | 90 | | | FB1 | 25 | | | | |
| Comparative Example 23 | CA7 | 72 | | | FB1 | 25 | | | PL1 | 18 |
| Comparative Example 24 | CA8 | 72 | | | FB1 | 25 | | | PL1 | 18 |
| Comparative Example 25 | RC1 | 90 | | | FB1 | 25 | | | | |
| Example 42 | CA2 | 90 | EL1 | 10 | FB1 | 25 | | | | |
| Example 43 | CA3 | 90 | EL1 | 10 | FB1 | 25 | | | | |
| Example 44 | CA4 | 90 | EL1 | 10 | FB1 | 25 | | | | |
| Example 45 | CA5 | 90 | EL1 | 10 | FB1 | 25 | | | | |
| Example 46 | CA6 | 90 | EL1 | 10 | FB1 | 25 | | | | |
| Example 47 | CA7 | 72 | EL1 | 10 | FB1 | 25 | | | PL1 | 18 |
| Example 48 | CA8 | 72 | EL1 | 10 | FB1 | 25 | | | PL1 | 18 |
| Example 49 | RC1 | 90 | EL1 | 10 | FB1 | 25 | | | | |
| Example 50 | RC2 | 100 | RC2 (including derivation thereof) | | FB1 | 25 | | | | |
| Example 51 | RC2 | 100 | EL1 | 10 | FB1 | 25 | | | | |

| | Composition ratio | | | Kneading temperature [° C.] | Molding temperature [° C.] | Mold temperature [° C.] | Tensile elastic modulus [MPa] | Tensile strength [MPa] |
|---|---|---|---|---|---|---|---|---|
| Section | C/(A + B + C) | B/(A + B) | D(A + D) | | | | | |
| Comparative Example 18 | 0.22 | 0 | 0 | 240 | 240 | 60 | 2600 | 51 |
| Comparative Example 19 | 0.22 | 0 | 0 | 240 | 240 | 60 | 2700 | 52 |
| Comparative Example 20 | 0.22 | 0 | 0 | 250 | 250 | 60 | 3100 | 72 |
| Comparative Example 21 | 0.22 | 0 | 0 | 240 | 240 | 60 | 2600 | 53 |
| Comparative Example 22 | 0.22 | 0 | 0 | 240 | 240 | 60 | 2300 | 45 |
| Comparative Example 23 | 0.26 | 0 | 0 | 230 | 230 | 60 | 2800 | 60 |
| Comparative Example 24 | 0.26 | 0 | 0 | 250 | 250 | 60 | 2800 | 62 |
| Comparative Example 25 | 0.22 | 0 | 0 | 210 | 210 | 40 | 2200 | 48 |
| Example 42 | 0.2 | 0.1 | 0 | 230 | 230 | 60 | 4000 | 59 |
| Example 43 | 0.2 | 0.1 | 0 | 230 | 230 | 60 | 4200 | 58 |
| Example 44 | 0.2 | 0.1 | 0 | 240 | 240 | 60 | 5500 | 85 |
| Example 45 | 0.2 | 0.1 | 0 | 230 | 230 | 60 | 4200 | 66 |
| Example 46 | 0.2 | 0.1 | 0 | 230 | 230 | 60 | 3900 | 55 |
| Example 47 | 0.23 | 0.12 | 0 | 230 | 230 | 60 | 3200 | 65 |
| Example 48 | 0.23 | 0.12 | 0 | 250 | 250 | 60 | 2900 | 66 |
| Example 49 | 0.2 | 0.1 | 0 | 210 | 210 | 40 | 3600 | 60 |
| Example 50 | <0.2 | >0.05 | 0 | 230 | 230 | 60 | 4000 | 63 |
| Example 51 | <0.19 | >0.09 | 0 | 220 | 220 | 40 | 3800 | 62 |

TABLE 5

| | Material (quantities in terms of parts by mass) | | | | | | | | | |
|---|---|---|---|---|---|---|---|---|---|---|
| | (A) | | (B) | | (C) | | (D) | | Others | |
| Section | Type | Quantity | Type | Quantity | Type | Quantity | Type | Quantity | Type | Quantity |
| Comparative Example 26 | CA2 | 90 | | | FB3 | 25 | | | | |
| Comparative Example 27 | CA3 | 90 | | | FB3 | 25 | | | | |
| Comparative Example 28 | CA4 | 90 | | | FB3 | 25 | | | | |
| Comparative Example 29 | CA5 | 90 | | | FB3 | 25 | | | | |
| Comparative Example 30 | CA6 | 90 | | | FB3 | 25 | | | | |
| Comparative Example 31 | CA7 | 72 | | | FB3 | 25 | | | PL1 | 18 |
| Comparative Example 32 | CA8 | 72 | | | FB3 | 25 | | | PL1 | 18 |
| Comparative Example 33 | RC1 | 90 | | | FB3 | 25 | | | | |
| Example 52 | CA2 | 90 | EL1 | 10 | FB3 | 25 | | | | |
| Example 53 | CA3 | 90 | EL1 | 10 | FB3 | 25 | | | | |
| Example 54 | CA4 | 90 | EL1 | 10 | FB3 | 25 | | | | |
| Example 55 | CA5 | 90 | EL1 | 10 | FB3 | 25 | | | | |
| Example 56 | CA6 | 90 | EL1 | 10 | FB3 | 25 | | | | |
| Example 57 | CA7 | 72 | EL1 | 10 | FB3 | 25 | | | PL1 | 18 |
| Example 58 | CA8 | 72 | EL1 | 10 | FB3 | 25 | | | PL1 | 18 |
| Example 59 | RC1 | 90 | EL1 | 10 | FB3 | 25 | | | | |
| Example 60 | RC2 | 100 | RC2 (including derivation thereof) | | FB3 | 25 | | | | |
| Example 61 | RC2 | 100 | EL1 | 10 | FB3 | 25 | | | | |

| | Composition ratio | | | Kneading temperature [° C.] | Molding temperature [° C.] | Mold temperature [° C.] | Tensile elastic modulus [MPa] | Tensile strength [MPa] |
|---|---|---|---|---|---|---|---|---|
| Section | C/(A + B + C) | B/(A + B) | D(A + D) | | | | | |
| Comparative Example 26 | 0.22 | 0 | 0 | 240 | 240 | 60 | 2900 | 59 |
| Comparative Example 27 | 0.22 | 0 | 0 | 240 | 240 | 60 | 2900 | 59 |
| Comparative Example 28 | 0.22 | 0 | 0 | 250 | 250 | 60 | 3600 | 81 |
| Comparative Example 29 | 0.22 | 0 | 0 | 240 | 240 | 60 | 2800 | 58 |
| Comparative Example 30 | 0.22 | 0 | 0 | 240 | 240 | 60 | 2600 | 56 |
| Comparative Example 31 | 0.26 | 0 | 0 | 230 | 230 | 60 | 3000 | 65 |
| Comparative Example 32 | 0.26 | 0 | 0 | 250 | 250 | 60 | 2800 | 66 |
| Comparative Example 33 | 0.22 | 0 | 0 | 210 | 210 | 40 | 2400 | 54 |
| Example 52 | 0.2 | 0.1 | 0 | 240 | 240 | 60 | 5100 | 79 |
| Example 53 | 0.2 | 0.1 | 0 | 240 | 240 | 60 | 5100 | 78 |
| Example 54 | 0.2 | 0.1 | 0 | 240 | 240 | 60 | 6200 | 109 |
| Example 55 | 0.2 | 0.1 | 0 | 240 | 240 | 60 | 5200 | 81 |
| Example 56 | 0.2 | 0.1 | 0 | 240 | 240 | 60 | 5200 | 79 |
| Example 57 | 0.23 | 0.12 | 0 | 230 | 230 | 60 | 3400 | 71 |
| Example 58 | 0.23 | 0.12 | 0 | 250 | 250 | 60 | 2900 | 70 |
| Example 59 | 0.2 | 0.1 | 0 | 210 | 210 | 40 | 4200 | 68 |
| Example 60 | <0.2 | >0.05 | 0 | 240 | 240 | 60 | 4800 | 75 |
| Example 61 | <0.19 | >0.05 | 0 | 230 | 230 | 60 | 4700 | 72 |

TABLE 6

| | Material (quantities in terms of parts by mass) | | | | | | | | | |
|---|---|---|---|---|---|---|---|---|---|---|
| | (A) | | (B) | | (C) | | (D) | | Others | |
| Section | Type | Quantity | Type | Quantity | Type | Quantity | Type | Quantity | Type | Quantity |
| Comparative Example 34 | CA1 | 79.2 | | | FB1 | 25 | CN1 | 10.8 | | |
| Comparative Example 35 | CA1 | 79.2 | | | FB1 | 25 | CN2 | 10.8 | | |
| Comparative Example 36 | CA1 | 79.2 | | | FB1 | 25 | CN3 | 10.8 | | |
| Comparative Example 37 | CA1 | 79.2 | | | FB1 | 25 | CN4 | 10.8 | | |
| Comparative Example 38 | CA1 | 79.2 | | | FB1 | 25 | CN5 | 10.8 | | |
| Comparative Example 39 | CA1 | 79.2 | | | FB1 | 25 | CN6 | 10.8 | | |
| Comparative Example 40 | CA1 | 79.2 | | | FB1 | 25 | CN7 | 10.8 | | |
| Comparative Example 41 | CA1 | 89.5 | | | FB1 | 25 | CN1 | 1.5 | | |
| Comparative Example 42 | CA1 | 88.5 | | | FB1 | 25 | CN1 | 2.5 | | |
| Comparative Example 43 | CA1 | 82.5 | | | FB1 | 25 | CN2 | 17.5 | | |
| Comparative Example 44 | CA1 | 77.5 | | | FB1 | 25 | CN3 | 22.5 | | |
| Example 62 | CA1 | 79.2 | EL1 | 10 | FB1 | 25 | CN1 | 10.8 | | |
| Example 63 | CA1 | 79.2 | EL1 | 10 | FB1 | 25 | CN2 | 10.8 | | |
| Example 64 | CA1 | 79.2 | EL1 | 10 | FB1 | 25 | CN3 | 10.8 | | |
| Example 65 | CA1 | 79.2 | EL1 | 10 | FB1 | 25 | CN4 | 10.8 | | |
| Example 66 | CA1 | 79.2 | EL1 | 10 | FB1 | 25 | CN5 | 10.8 | | |
| Example 67 | CA1 | 79.2 | EL1 | 10 | FB1 | 25 | CN6 | 10.8 | | |
| Example 68 | CA1 | 79.2 | EL1 | 10 | FB1 | 25 | CN7 | 10.8 | | |
| Example 69 | CA1 | 89.5 | EL1 | 10 | FB1 | 25 | CN1 | 1.5 | | |
| Example 70 | CA1 | 88.5 | EL1 | 10 | FB1 | 25 | CN1 | 2.5 | | |
| Example 71 | CA1 | 82.5 | EL1 | 10 | FB1 | 25 | CN2 | 17.5 | | |
| Example 72 | CA1 | 77.5 | EL1 | 10 | FB1 | 25 | CN3 | 22.5 | | |

| | Composition ratio | | | Kneading temperature [° C.] | Molding temperature [° C.] | Mold temperature [° C.] | Tensile elastic modulus [MPa] | Tensile strength [MPa] |
|---|---|---|---|---|---|---|---|---|
| Section | C/(A + B + C) | B/(A + B) | D(A + D) | | | | | |
| Comparative Example 34 | 0.24 | 0 | 0.12 | 230 | 230 | 60 | 2200 | 50 |
| Comparative Example 35 | 0.24 | 0 | 0.12 | 230 | 230 | 60 | 2200 | 50 |
| Comparative Example 36 | 0.24 | 0 | 0.12 | 230 | 230 | 60 | 2300 | 52 |
| Comparative Example 37 | 0.24 | 0 | 0.12 | 230 | 230 | 60 | 2300 | 52 |
| Comparative Example 38 | 0.24 | 0 | 0.12 | 230 | 230 | 60 | 2200 | 51 |
| Comparative Example 39 | 0.24 | 0 | 0.12 | 230 | 230 | 60 | 2300 | 51 |
| Comparative Example 40 | 0.24 | 0 | 0.12 | 230 | 230 | 60 | 2400 | 52 |
| Comparative Example 41 | 0.22 | 0 | 0.016 | 240 | 240 | 60 | 2500 | 53 |
| Comparative Example 42 | 0.22 | 0 | 0.027 | 240 | 240 | 60 | 2500 | 52 |
| Comparative Example 43 | 0.23 | 0 | 0.175 | 210 | 210 | 40 | 1900 | 47 |
| Comparative Example 44 | 0.24 | 0 | 0.225 | 210 | 210 | 40 | 1600 | 45 |
| Example 62 | 0.22 | 0.11 | 0.12 | 210 | 210 | 40 | 4700 | 74 |
| Example 63 | 0.22 | 0.11 | 0.12 | 210 | 210 | 40 | 4700 | 74 |
| Example 64 | 0.22 | 0.11 | 0.12 | 210 | 210 | 40 | 4800 | 74 |
| Example 65 | 0.22 | 0.11 | 0.12 | 210 | 210 | 40 | 4400 | 67 |
| Example 66 | 0.22 | 0.11 | 0.12 | 210 | 210 | 40 | 4700 | 75 |
| Example 67 | 0.22 | 0.11 | 0.12 | 210 | 210 | 40 | 4500 | 67 |
| Example 68 | 0.22 | 0.11 | 0.12 | 210 | 210 | 40 | 4400 | 67 |
| Example 69 | 0.20 | 0.10 | 0.016 | 230 | 230 | 60 | 4400 | 67 |
| Example 70 | 0.20 | 0.10 | 0.027 | 230 | 230 | 60 | 5200 | 72 |
| Example 71 | 0.21 | 0.11 | 0.175 | 210 | 210 | 40 | 3600 | 69 |
| Example 72 | 0.22 | 0.11 | 0.225 | 210 | 210 | 40 | 2100 | 53 |

TABLE 7

| Section | Material (quantities in terms of parts by mass) | | | | | | | | | |
|---|---|---|---|---|---|---|---|---|---|---|
| | (A) | | (B) | | (C) | | (D) | | Others | |
| | Type | Quantity | Type | Quantity | Type | Quantity | Type | Quantity | Type | Quantity |
| Comparative Example 45 | CA1 | 79.2 | | | FB3 | 25 | CN1 | 10.8 | | |
| Comparative Example 46 | CA1 | 79.2 | | | FB3 | 25 | CN2 | 10.8 | | |
| Comparative Example 47 | CA1 | 79.2 | | | FB3 | 25 | CN3 | 10.8 | | |
| Comparative Example 48 | CA1 | 79.2 | | | FB3 | 25 | CN4 | 10.8 | | |
| Comparative Example 49 | CA1 | 79.2 | | | FB3 | 25 | CN5 | 10.8 | | |
| Comparative Example 50 | CA1 | 79.2 | | | FB3 | 25 | CN6 | 10.8 | | |
| Comparative Example 51 | CA1 | 79.2 | | | FB3 | 25 | CN7 | 10.8 | | |
| Comparative Example 52 | CA1 | 89.5 | | | FB3 | 25 | CN1 | 1.5 | | |
| Comparative Example 53 | CA1 | 88.5 | | | FB3 | 25 | CN1 | 2.5 | | |
| Comparative Example 54 | CA1 | 82.5 | | | FB3 | 25 | CN2 | 17.5 | | |
| Comparative Example 55 | CA1 | 77.5 | | | FB3 | 25 | CN3 | 22.5 | | |
| Example 73 | CA1 | 79.2 | EL1 | 10 | FB3 | 25 | CN1 | 10.8 | | |
| Example 74 | CA1 | 79.2 | EL1 | 10 | FB3 | 25 | CN2 | 10.8 | | |
| Example 75 | CA1 | 79.2 | EL1 | 10 | FB3 | 25 | CN3 | 10.8 | | |
| Example 76 | CA1 | 79.2 | EL1 | 10 | FB3 | 25 | CN4 | 10.8 | | |
| Example 77 | CA1 | 79.2 | EL1 | 10 | FB3 | 25 | CN5 | 10.8 | | |
| Example 78 | CA1 | 79.2 | EL1 | 10 | FB3 | 25 | CN6 | 10.8 | | |
| Example 79 | CA1 | 79.2 | EL1 | 10 | FB3 | 25 | CN7 | 10.8 | | |
| Example 80 | CA1 | 89.5 | EL1 | 10 | FB3 | 25 | CN1 | 1.5 | | |
| Example 81 | CA1 | 88.5 | EL1 | 10 | FB3 | 25 | CN1 | 2.5 | | |
| Example 82 | CA1 | 82.5 | EL1 | 10 | FB3 | 25 | CN2 | 17.5 | | |
| Example 83 | CA1 | 77.5 | EL1 | 10 | FB3 | 25 | CN3 | 22.5 | | |

| Section | Composition ratio | | | Kneading temperature [° C.] | Molding temperature [° C.] | Mold temperature [° C.] | Tensile elastic modulus [MPa] | Tensile strength [MPa] |
|---|---|---|---|---|---|---|---|---|
| | C/(A + B + C) | B/(A + B) | D(A + D) | | | | | |
| Comparative Example 45 | 0.24 | 0 | 0.12 | 230 | 230 | 60 | 2400 | 55 |
| Comparative Example 46 | 0.24 | 0 | 0.12 | 230 | 230 | 60 | 2400 | 54 |
| Comparative Example 47 | 0.24 | 0 | 0.12 | 230 | 230 | 60 | 2600 | 54 |
| Comparative Example 48 | 0.24 | 0 | 0.12 | 230 | 230 | 60 | 2500 | 55 |
| Comparative Example 49 | 0.24 | 0 | 0.12 | 230 | 230 | 60 | 2400 | 55 |
| Comparative Example 50 | 0.24 | 0 | 0.12 | 230 | 230 | 60 | 2500 | 53 |
| Comparative Example 51 | 0.24 | 0 | 0.12 | 230 | 230 | 60 | 2500 | 54 |
| Comparative Example 52 | 0.22 | 0 | 0.016 | 240 | 240 | 60 | 2600 | 58 |
| Comparative Example 53 | 0.22 | 0 | 0.027 | 240 | 240 | 60 | 2400 | 56 |
| Comparative Example 54 | 0.23 | 0 | 0.175 | 210 | 210 | 40 | 2100 | 52 |
| Comparative Example 55 | 0.24 | 0 | 0.225 | 210 | 210 | 40 | 1900 | 51 |
| Example 73 | 0.22 | 0.11 | 0.12 | 210 | 210 | 40 | 6000 | 89 |
| Example 74 | 0.22 | 0.11 | 0.12 | 210 | 210 | 40 | 6000 | 88 |
| Example 75 | 0.22 | 0.11 | 0.12 | 210 | 210 | 40 | 6000 | 89 |
| Example 76 | 0.22 | 0.11 | 0.12 | 210 | 210 | 40 | 5700 | 84 |
| Example 77 | 0.22 | 0.11 | 0.12 | 210 | 210 | 40 | 6100 | 90 |
| Example 78 | 0.22 | 0.11 | 0.12 | 210 | 210 | 40 | 5600 | 84 |
| Example 79 | 0.22 | 0.11 | 0.12 | 210 | 210 | 40 | 5600 | 83 |
| Example 80 | 0.20 | 0.10 | 0.016 | 240 | 240 | 60 | 5700 | 83 |
| Example 81 | 0.20 | 0.10 | 0.027 | 240 | 240 | 60 | 6300 | 88 |
| Example 82 | 0.21 | 0.11 | 0.175 | 210 | 210 | 40 | 3900 | 75 |
| Example 83 | 0.22 | 0.11 | 0.225 | 210 | 210 | 40 | 2600 | 57 |

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A resin composition comprising:
   a cellulose acylate (A) selected from the group consisting of cellulose acetate propionate, cellulose acetate butyrate and combinations thereof;
   a thermoplastic elastomer (B) comprising a polymer having a core shell structure; and
   a fiber (C) chosen from cellulose fiber, kenaf fiber, glass fiber, carbon fiber, polyester fiber, polyamide fiber, aramid fiber, polyurethane fiber, acrylic fiber, vinylon fiber, polyethylene fiber, or combinations thereof, wherein the fiber (C) has an average fiber length from 1 to 10 mm;
   wherein the content of cellulose acylate (A) and thermoplastic elastomer (B) satisfy a relationship where the weight ratio (B)/{(A)+(B)} is from 0.1 to 0.3;
   wherein the content of cellulose acylate (A), thermoplastic elastomer (B) and fiber (C) satisfy a relationship where the weight ratio (C)/{(A)+(B)+(C)} is from 0.2 to 0.6; and
   wherein the resin composition has a tensile elastic modulus of 3000 MPa or more, measured by performing a tensile test in accordance with ISO 527:2012 using an ISO multipurpose test piece molded from said resin composition.

2. The resin composition according to claim 1, wherein the cellulose acylate (A) is cellulose acetate propionate.

3. The resin composition according to claim 1, wherein the thermoplastic elastomer (B) comprises a polymer (b1) having a core-shell structure including a core layer and a shell layer containing a polymer of an alkyl (meth)acrylate on a surface of the core layer.

4. The resin composition according to claim 1, wherein the fiber (C) contains a fiber having a hydroxy group on a surface of the fiber.

5. The resin composition according to claim 1, wherein the fiber (C) contains at least one selected from the group consisting of a glass fiber and a cellulose fiber, and wherein the fiber (C) has an average fiber length from 1 to 5 mm.

6. The resin composition according to claim 1, wherein a content of the cellulose acylate (A), a content of the thermoplastic elastomer (B), and a content of the fiber (C) satisfy a relationship $0.5 \leq (C)/\{(A)+(B)+(C)\} \leq 0.6$ in terms of mass.

7. The resin composition according to claim 1, wherein the content of the cellulose acylate (A) and the content of the thermoplastic elastomer (B) satisfy a relationship $0.1 \leq (B)/\{(A)+(B)\} 0.25$ in terms of mass.

8. The resin composition according to claim 1, further comprising a cardanol compound (D).

9. The resin composition according to claim 8, wherein the cardanol compound (D) contains a cardanol compound having a molecular weight of 500 or less.

10. The resin composition according to claim 8, wherein the content of the cellulose acylate (A) and a content of the cardanol compound (D) satisfy a relationship $0.02 \leq (D)/\{(A)+(D)\} \leq 0.2$ in terms of mass.

11. The resin composition according to claim 1, wherein the resin composition has a tensile strength of more than 55 MPa, measured by performing a tensile test in accordance with ISO 527:2012 using an ISO multipurpose test piece molded from said resin composition.

12. The resin composition according to claim 1, wherein the resin composition has a tensile strength of more than 65 MPa, measured by performing a tensile test in accordance with ISO 527:2012 using an ISO multipurpose test piece molded from said resin composition.

13. A resin molded article comprising the resin composition according to claim 1.

14. The resin molded article according to claim 13, being an injection molding article.

15. The resin molded article according to claim 13, having a tensile elastic modulus of 3500 MPa or more.

16. The resin molded article according to claim 15, wherein the fiber (C) is glass fiber having an average fiber length from 1 to 3 mm, and wherein the molded article has a tensile strength of from 80 to 121 MPa.

* * * * *